(12) United States Patent
Chen

(10) Patent No.: US 10,580,079 B1
(45) Date of Patent: Mar. 3, 2020

(54) ENTERPRISE NERVOUS SYSTEM

(71) Applicant: Allstate Insurance Company, Northbrook, IL (US)

(72) Inventor: Tao Chen, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 399 days.

(21) Appl. No.: 14/747,554

(22) Filed: Jun. 23, 2015

(51) Int. Cl.
*G06Q 40/08* (2012.01)
*H04M 3/493* (2006.01)

(52) U.S. Cl.
CPC ............ *G06Q 40/08* (2013.01); *H04M 3/493* (2013.01)

(58) Field of Classification Search
CPC ............... H04M 3/493; H04M 1/2477; H04M 2203/558; H04M 2203/1058; H04M 2250/10; H04M 3/5166; H04M 15/755; H04M 2242/08; H04M 3/42068; H04M 3/4936; G06C 50/22; G06Q 20/32; G06Q 50/22; G06F 21/552; G06F 17/30029; H04L 67/306; H04L 67/22
See application file for complete search history.

(56) References Cited

U.S. PATENT DOCUMENTS

| | | | | |
|---|---|---|---|---|
| 6,535,743 B1* | 3/2003 | Kennedy, III | ... | G08G 1/096872 340/988 |
| 6,724,887 B1* | 4/2004 | Eilbacher | ............ | H04M 3/5183 379/265.02 |
| 7,065,188 B1* | 6/2006 | Mei | ......................... | G10L 15/22 379/76 |
| 7,177,634 B2* | 2/2007 | Wang | .................... | H04M 3/493 455/410 |
| 7,398,218 B1 | 7/2008 | Bernaski et al. | | |
| 7,673,340 B1* | 3/2010 | Cohen | ................. | G06F 11/3438 379/266.08 |
| 7,773,731 B2* | 8/2010 | Malik | ................... | H04M 3/493 379/88.05 |
| 7,962,616 B2 | 6/2011 | Kupferman et al. | | |
| 8,099,496 B2 | 1/2012 | Singh et al. | | |

(Continued)

OTHER PUBLICATIONS

Business @ The Speed of Thought using a digital nervous system, Bill Gates, pp. xvii-xviii, xx-xxi, 4, 15, and 190; Original © 1999.

(Continued)

*Primary Examiner* — Mohammad Z Shaikh
(74) *Attorney, Agent, or Firm* — Banner & Witcoff, Ltd.

(57) ABSTRACT

Systems and methods for monitoring a user's insurance activities and generating an insurance agency IVR menu customized for each user are presented. In some embodiments, one or more items of interest to an insurance policyholder may be identified by analyzing past activity that the insurance policyholder has engaged in. A weighting may be assigned to the one or more identified items of interest based on the type of activity that the insurance policyholder has been engaged in. A plurality of natural language IVR menu options may be generated such that each IVR menu option corresponds to each of the one or more identified items of interest. The plurality of natural language IVR menu options may be provided to the insurance policyholder in an order that corresponds to the weighting of each identified item of interest corresponding to each of the plurality of natural language IVR menu options.

20 Claims, 8 Drawing Sheets

(56) References Cited

U.S. PATENT DOCUMENTS

| | | | |
|---|---|---|---|
| 8,103,256 B2* | 1/2012 | Gilmartin | H04M 3/5166 370/349 |
| 8,135,610 B1 | 3/2012 | Bryce et al. | |
| 8,155,276 B2* | 4/2012 | Beauregard | H04M 3/493 379/201.02 |
| 8,155,280 B1* | 4/2012 | Or-Bach | H04M 3/493 379/88.13 |
| 8,369,495 B1* | 2/2013 | Mallenahally Channakeshava | H04M 3/4936 379/88.18 |
| 8,374,636 B2* | 2/2013 | McDonough | H04L 51/38 455/412.1 |
| 8,406,388 B2* | 3/2013 | Or-Bach | H04M 3/493 379/88.13 |
| 8,494,148 B2* | 7/2013 | Erhart | H04M 3/5166 379/207.12 |
| 8,548,135 B1* | 10/2013 | Lavian | H04M 3/4936 379/142.06 |
| 8,615,396 B2* | 12/2013 | Grigsby | G10L 15/22 704/235 |
| 8,639,495 B2* | 1/2014 | Eggebraaten | G06F 17/28 704/257 |
| 8,645,169 B1 | 2/2014 | Hopkins, III | |
| 8,660,864 B2 | 2/2014 | Krause et al. | |
| 8,661,112 B2* | 2/2014 | Creamer | H04M 3/42059 379/88.16 |
| 8,718,632 B2* | 5/2014 | DiMeo | H04L 63/10 455/419 |
| 8,731,977 B1 | 5/2014 | Hardin et al. | |
| 8,799,125 B2 | 8/2014 | Schumann, Jr. | |
| 8,799,461 B2 | 8/2014 | Herz et al. | |
| 8,879,703 B1* | 11/2014 | Lavian | H04M 3/493 379/201.01 |
| 8,903,073 B2* | 12/2014 | Or-Bach | G06Q 30/0269 370/329 |
| 9,001,819 B1* | 4/2015 | Or-Bach | H04L 65/4015 370/352 |
| 9,008,285 B2* | 4/2015 | Abel | H04M 3/493 379/88.04 |
| 9,123,345 B2* | 9/2015 | Khanna | G10L 21/00 |
| 9,124,694 B2* | 9/2015 | Monegan | H04M 3/493 |
| 9,313,332 B1* | 4/2016 | Kumar | H04M 3/5232 |
| 9,432,509 B2* | 8/2016 | Tolksdorf | H04M 3/493 |
| 9,591,136 B1* | 3/2017 | Garcia | H04M 3/5166 |
| 9,679,487 B1 | 6/2017 | Hayward | |
| 9,701,305 B2* | 7/2017 | Paul | B60W 30/06 |
| 2002/0049535 A1* | 4/2002 | Rigo | G01C 21/3629 701/431 |
| 2002/0198743 A1 | 12/2002 | Ariathurai et al. | |
| 2003/0053615 A1* | 3/2003 | Anderson | G06Q 30/02 379/265.09 |
| 2004/0121814 A1* | 6/2004 | Creamer | H04M 1/72583 455/563 |
| 2004/0122941 A1* | 6/2004 | Creamer | H04M 3/42059 709/224 |
| 2004/0203634 A1* | 10/2004 | Wang | H04M 3/493 455/414.1 |
| 2007/0165799 A1* | 7/2007 | Juncker | H04M 3/385 379/88.21 |
| 2007/0211880 A1* | 9/2007 | Ross | H04M 3/4936 379/265.01 |
| 2008/0065427 A1 | 3/2008 | Helitzer et al. | |
| 2008/0304639 A1* | 12/2008 | McDonough | H04M 3/493 379/93.01 |
| 2009/0210257 A1 | 8/2009 | Chalfant et al. | |
| 2009/0292583 A1* | 11/2009 | Eilam | G06Q 10/06 705/7.31 |
| 2010/0250243 A1* | 9/2010 | Schalk | G10L 15/22 704/201 |
| 2012/0035923 A1* | 2/2012 | Krause | H04W 4/18 704/235 |
| 2012/0053964 A1 | 3/2012 | Williams et al. | |
| 2012/0054213 A1 | 3/2012 | Puttaswamy et al. | |
| 2012/0109692 A1* | 5/2012 | Collins | G06Q 40/08 705/4 |
| 2012/0143634 A1 | 6/2012 | Beyda et al. | |
| 2012/0253551 A1* | 10/2012 | Halimi | G07C 5/008 701/1 |
| 2012/0253823 A1* | 10/2012 | Schalk | G01C 21/3608 704/270.1 |
| 2012/0259951 A1* | 10/2012 | Schalk | G07C 5/008 709/217 |
| 2012/0296494 A1* | 11/2012 | Gersabeck | G01C 21/26 701/2 |
| 2013/0006675 A1 | 1/2013 | Bowne et al. | |
| 2013/0046562 A1 | 2/2013 | Taylor et al. | |
| 2013/0096954 A1 | 4/2013 | Bodas | |
| 2013/0185176 A1* | 7/2013 | Anchala | G06Q 30/02 705/27.1 |
| 2013/0204645 A1 | 8/2013 | Lehman et al. | |
| 2013/0226624 A1 | 8/2013 | Blessman et al. | |
| 2013/0247005 A1 | 9/2013 | Hirsch et al. | |
| 2013/0325517 A1 | 12/2013 | Berg | |
| 2013/0346447 A1 | 12/2013 | Wu et al. | |
| 2014/0040017 A1 | 2/2014 | Bafna et al. | |
| 2014/0172660 A1 | 6/2014 | Louie et al. | |
| 2014/0200928 A1* | 7/2014 | Watanabe | G06Q 40/08 705/4 |
| 2014/0278575 A1 | 9/2014 | Anton et al. | |
| 2014/0372224 A1 | 12/2014 | Tawakol et al. | |
| 2015/0030140 A1* | 1/2015 | Abel | H04M 3/493 379/88.01 |
| 2015/0071418 A1* | 3/2015 | Shaffer | H04M 3/493 379/88.01 |
| 2015/0181037 A1* | 6/2015 | Bailey | G06Q 40/08 705/4 |
| 2015/0220619 A1* | 8/2015 | Gray | G06F 16/22 707/738 |
| 2016/0057383 A1* | 2/2016 | Pattan | H04L 65/602 348/14.03 |
| 2016/0078490 A1 | 3/2016 | Tumen et al. | |
| 2016/0253688 A1* | 9/2016 | Nielsen | G06Q 30/0202 705/7.31 |

OTHER PUBLICATIONS

Behavioral Analysis Unit, https://en.wikipedia.org/wiki/Behavioral_Analysis_Unit, downloaded Jun. 23, 2015, 5 pages.

Digital nervous system, https://en.wikipedia.org/wiki/Digital_nervous_system, downloaded Jun. 23, 2015, 2 pages.

Business Activity Monitoring (BAM) Software I BPM BAM I BPM Solution, Why BPM and BAM are Critical, http://www.openspan.com/solutions/bpm_bam, © 2014 OpenSpan, Inc., downloaded Oct. 29, 2014, 2 pages.

Consumer Privacy and Data Protection, Protecting Personal Information Through Commercial Best Practices, Paul Selis, et al., 2002, http://www.atg.wa.gov/uploadedfiles/home/safeguarding_consumers/consumer_isses_a-z/corporate_responsibility/privacypolicy1.pdf, 17 pages.

Mobile technology in insurance, Performance measurement methodology, © 2014 EYGM Limited, 14 pages.

Data Science in the Insurance Industry/MastersinDataScience.org, Insurance, Analysis and Insurance, http://www/mastersindatascience.org/industry/insurance/, downloaded Oct. 27, 2014, 14 pages.

White Paper: Improving Access to Data for Successful Business Intelligence Part 2: Supporting Multiple Analytical Workloads in a Changing Analytical Landscape, Mike Ferguson, Mar. 2014, © Intelligent Business Strategies Limited, 2014, 11 pages.

Business @ the Speed of Thought: Succeeding in the Digital Economy, Bill Gates, Original © 1999, 6 pages.

Nov. 30, 2017—U.S. Non-Final Office Action—U.S. Appl. No. 14/747,557.

* cited by examiner

ENTERPRISE NERVOUS SYSTEM

TECHNICAL FIELD

Aspects of the disclosure generally relate to data management and collection. In particular, various aspects described herein relate to collecting insurance data from various sources and distributing pertinent insurance data to appropriate applications that benefit from receiving such data.

BACKGROUND

With the proliferation of mobile applications and online data management tools, insurance policyholders have an ever increasing number of channels for accessing their insurance data and for interacting with their insurer. Similarly, with the proliferation of mobile devices and advances in telemetry, insurance companies also have an increasing set of information on their policyholders' behaviors and have access to an ever increasing set of user activities performed by their insured policyholders. However, as a result of increasing the number of channels through which insurance information is exchanged between policyholders, insurance agents, and the insurance company, the insurance company is segmented into these various channels. Information collected from one insurance channel does not effectively reach a different channel used for a different application by the insurance company.

Furthermore, conventional systems are not able to integrate the various types of data gathered from their policyholders to be able to provide their policyholders information responsive to the policyholders' real-time activity that may be monitored by a separate insurance data collection channel. Therefore there is a need for an insurance system that is able to consolidate real-time information gathered from the user across multiple different channels and determine what actions to perform through the different channels that best serves the policyholder and the insurance company's needs based on the gathered real-time information.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for an interactive voice response (IVR) computing device to one or more items of interest to an insurance policyholder by analyzing past activity of the insurance policyholder, assign a weighting to the one or more identified items of interest based on a type of activity in which the insurance policyholder has engaged, generate a plurality of natural language IVR menu options, wherein one or more of the plurality of natural language IVR menu options corresponds to the one or more identified items of interest, and provide a telecommunications device associated with the insurance policyholder, the plurality of natural language IVR menu options ordered according to the weight of an identified item of interest corresponding to the one or more of the plurality of natural language IVR menu options.

These and other features and advantages of the disclosure will be apparent from the additional description provided herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which it is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
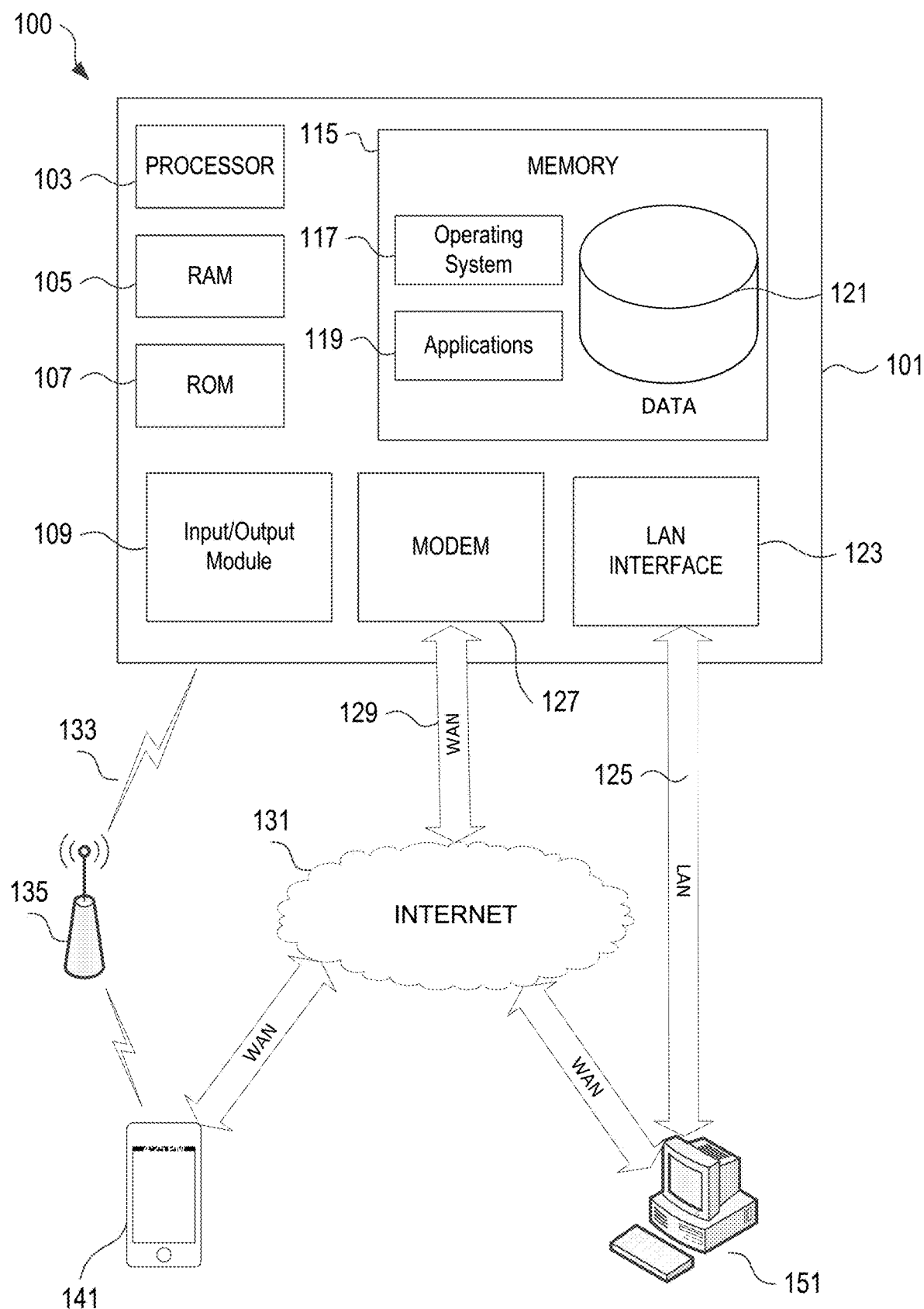
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as various servers or systems, such as an insurance claim coverage system, configured as described herein for receiving data associated with one or more users having primary and secondary insurance, determining whether the secondary insurance provides coverage for a service for which a claim was submitted to the primary insurance, and notifying the user of the potential eligibility for coverage.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a plurality of users, receive insurance claim information associated with the plurality of users, determine whether the plurality of users are eligible for coverage under a secondary insurance and provide a notification to the users of the eligibility.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the insurance claim coverage system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the insurance claim coverage system 101 may include computer-executable instructions (e.g., insurance data analysis, etc.) for receiving data claims submitted to a primary insurance provider, analyzing the data to whether the services for which the claims were submitted, or a portion thereof, may be covered by a secondary insurance and/or providing a notification to the user of the potential eligibility for coverage.

In other embodiments, the device 101 may include fewer or more elements. For example, the device 101 may use the processor(s) 103 to perform functions of the device 101, and thus, might not include a separate processor or hardware for the device 101. Additionally, or alternatively, the device 101 may be a mobile device (e.g., a smartphone, tablet, and the like) configured to communicate with one or more sensors that collects information on insured property and relay that information back to a remote server that contains account information on the insurance policyholder associated with the insured property that the information is being collected about. Device 101 may also include various other components, such as a battery, speaker, and/or antennas (not shown). Also, the device 101 may be a telematics device and/or a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, and the like). For example, the device 101 may be a vehicle's computer or a device plugged into the vehicle's computer for use in vehicle telematics.

The systems described herein may be used by an insurance company to perform scene investigation and detect damages to insured properties of users who have an insurance account with the insurance company. Although many examples herein will be described as being used in conjunction with an insurance company, the systems and methods described herein may be used by or with other entities or types of entities without departing from the disclosure. For instance, the system may be implemented by a property inspection agency and/or a property appraisal agency.

Figure 2:
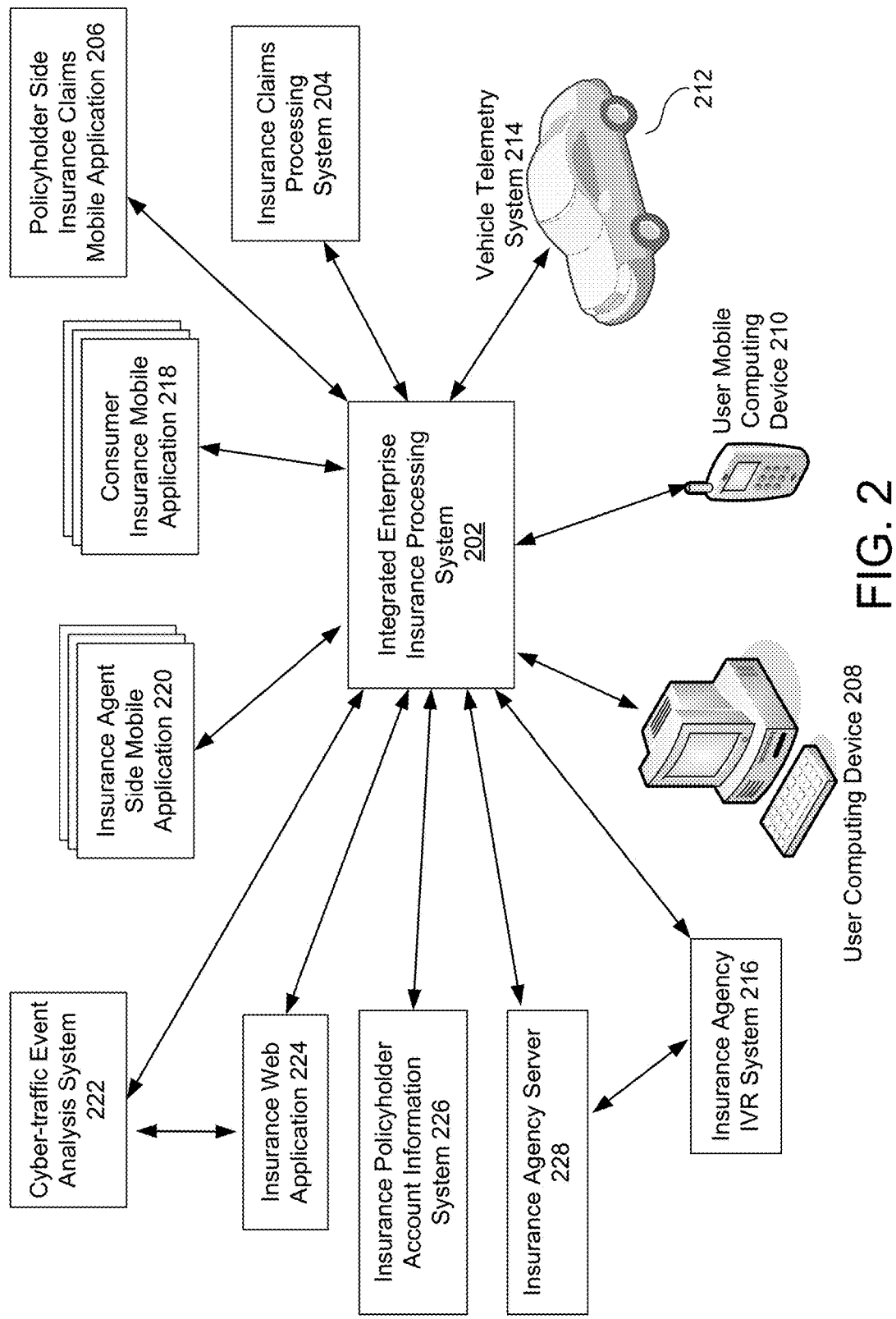
FIG. 2 illustrates an insurance data collection system for gathering insurance data according to one or more aspects described herein.

The computerized methods for collecting damage information from an insured property and making an insurance policy decision as disclosed herein may be implemented on one or more devices 101 used in various network environments. FIG. 2 illustrates an example network environment 200 for implementing methods in accordance with aspects of the present disclosure.

FIG. 2 illustrates a block diagram illustrating system architecture 200 for gathering insurance data and delivering pertinent insurance information to various recipients associated with the insurance organizations. The integrated enterprise insurance processing system (IEIPS) 202, which may also be referred to as the enterprise processing system 202 and/or the central processing system 202, may collect information from and transmit information to an insurance policyholder through various different channels such as a user mobile computing device 210, a user computing device 208, a policyholder side insurance claims mobile application 206, a consumer insurance mobile application 218, and an insurance web application 224. The integrated enterprise insurance processing system 202 may receive user data for its insurance policyholders through channels such as insurance claims processing system 204, vehicle telemetry system 214, insurance agency server 228, insurance policyholder account information 226, cyber-traffic event analysis system 222, and insurance agency interactive voice response (IVR) system 216. The integrated enterprise insurance processing system 202 may communicate with insurance agents (e.g., employees/contractors of the insurance company) with information about its policyholders through channels such as insurance agent side mobile application 220, insurance agency server 228, and insurance agency IVR system 216.

In some embodiments, the integrated enterprise insurance processing system 202 may collect information from and transmit information to each of the various applications, databases, devices, and backend servers described in FIG. 2. The integrated enterprise insurance processing system 202 may collect information about policyholders such as their real-time activity and interactions, predict their insurance needs, and determine strategies utilizing the various channels of communication with the policyholder so as to determine how to best engage the policyholder and serve the policyholder and the insurance organization's needs. For example, the integrated enterprise insurance processing system 202 may collect information about what the user is currently engaged in with the insurance web application 224 to identify that the user is interested in changing his automobile insurance policy to reduce his monthly insurance premiums. Based on such a determination, the integrated enterprise insurance processing system 202 may analyze historic account information for that policyholder by gathering data from the insurance claims processing system 204, the insurance agency server 228 and/or the insurance policyholder account information system 226 to determine that the user qualifies for a loyal customer promotional rebate. The integrated enterprise insurance processing system 202 may determine that the user may be browsing a competitor's policy and accordingly, the integrated enterprise insurance processing system 202 may determine when to contact the policyholder and through which channel to contact the policyholder to offer him the promotional rebate in order to retain and/or renew the policyholder's insurance contract. The integrated enterprise insurance processing system 202 may enable a plurality of different permutations of strategies such as the above example by being able to sense real-time policyholder interaction through various different channels. By analyzing data relevant to that policyholder, the integrated enterprise insurance processing system 202 may instruct one of the various channels that it is communicatively coupled to on how to better serve the needs of insurance organization and/or the policyholder.

In some embodiments, the integrated enterprise insurance processing system 202 may communicate with a user (e.g., an insurance policyholder) and gather user data through a consumer insurance mobile application 218. The integrated enterprise insurance processing system 202 may collect user data from interactions of the user with the user interface of the consumer insurance mobile application 218. The consumer insurance mobile application 218 may allow the user to manage account preferences, schedule maintenance/repairs for the insured product, communicate with the insurance organization, etc.

In some embodiments, a policyholder may submit insurance claims to the insurance organization through a policyholder side insurance claims mobile application 206. The integrated enterprise processing system 202 may receive insurance claims data submitted through the policyholder side insurance claims mobile application 206 and may process such claims data. The policyholder insurance claims mobile application 206 may be a standalone mobile application or it may be a part of the consumer insurance mobile application 218. The user of the policyholder side insurance claims mobile application 206 (e.g., the insurance policyholder) may input insurance claims for an insured property to the insurance organization, provide additional evidence (e.g., photo, video, sound recording, etc.) to further support the claims request using the policyholder side insurance claims mobile application 206.

In some embodiments, the insurance claims processing system 204 may maintain policyholder claims information. After claims are received from the user through the policyholder side insurance claims mobile application 206, an insurance agency server 228 (e.g., an insurance agent may input a telephonic claims request into the insurance agency server 228), and/or the insurance web application 224, the claims processing system 204 may update the claims data on file for the policyholder with the received claims information. The insurance claims processing system 204 may contain updated data and/or the outcome of a claims request as the insurance organization approves or denies the submitted policyholder claim. The integrated enterprise insurance processing system 202 may detect when such results/updates to a claims request have been updated at the insurance claims processing system 204 and may update the consumer insurance mobile application 218, the insurance agency server 228, and/or instruct the insurance agency IVR system 216 to contact the policyholder through his telephone and/or mobile computing device 210 to inform them of the claims information update/outcome.

In some embodiments, the insurance policyholder may interact with an insurance web application 224 using the user computing device 208 and/or user mobile computing device 210. The user may be able to view and/or implement policy changes to their previously existing insurance policy coverage, add new insurance policies, and/or cancel current policies using the insurance web application 224. The insurance policyholder may also be able to file an insurance claim through the insurance web application 224.

In some embodiments, the cyber traffic event analysis system 222 may monitor user activity on online insurance portals. By analyzing one or more policyholders' activity with the insurance web application 224, the cyber traffic event analysis system 222 may determine what changes a policyholder is making to his account and collect further information on the policyholder's online activities with relation to the insurance web application 224.

In some embodiments, in addition to collecting user information from mobile applications and web applications, user information for policyholders may be collected from various other channels such as user computing device 208, user mobile computing device 210, and vehicle telemetry system 214. The integrated enterprise insurance processing system 202 may collect telematics information regarding the automobile 212 and the driving record of the policyholder in order to inform the integrated enterprise insurance processing system 202 about recent accidents, speeding history, and driving ability of the policyholder. The integrated enterprise insurance processing system 202 may use such information to provide incentives and/or make recommendations to the user through the various insurance channels that it manages.

In some embodiments, the insurance policyholder account information system 226 may maintain and dynamically update records for each of its policyholders. For example, each data point that is entered by the telemetry system 214, insurance claims processing system 204, user interaction with consumer mobile application 218, information learned about the policyholder from the insurance agency IVR system 216 and/or an insurance agent that is reported either through the insurance agency server 208 and/or the insurance agent side mobile application 220, and/or user activity through the insurance web application 224, may be recorded in the insurance policyholder account information system 226. The integrated enterprise insurance processing system 202 may consult the insurance policyholder account information system 226 to identify account information associated with the policyholder, and to determine the user preferences when creating strategic recommendations to the policyholder and/or determining insurance items and/or activities of interest to the policyholder.

In some embodiments, the insurance agent side mobile application 220 may provide insurance agents information about policyholders useful for conducting their duties efficiently. Various insurance agents (e.g., employees of the insurance organization) may update the insurance agent side mobile application 220 with information about different policyholders and prospective new customers that they interact with. Such information may be analyzed by the integrated enterprise insurance processing system 202 to determine the best strategic approach to serve these policyholders and prospective new customers. The integrated enterprise insurance processing system 202 may also update the insurance agent side mobile application 220 with information that each insurance agent would find useful (e.g., information identifying the interests, preferences, and recent activities of various different policyholders).

In some embodiments, the insurance agency server 228 may aggregate information recorded by insurance agents and from policyholder interactions with insurance agents. The information in insurance agency server 228 may be received directly from information collected by the insurance agent side mobile application 220. Additionally or alternatively, insurance agents may also update the information for a particular policyholder in the insurance agency server 228 as a result of interacting and/or assisting the particular policyholder.

In some embodiments, the insurance agency IVR system 216 may handle incoming messages or telephone calls to an insurance organization. The various capabilities and functions of the insurance agency IVR system 216 are further described in detail with relation to FIG. 4.

Figure 3:
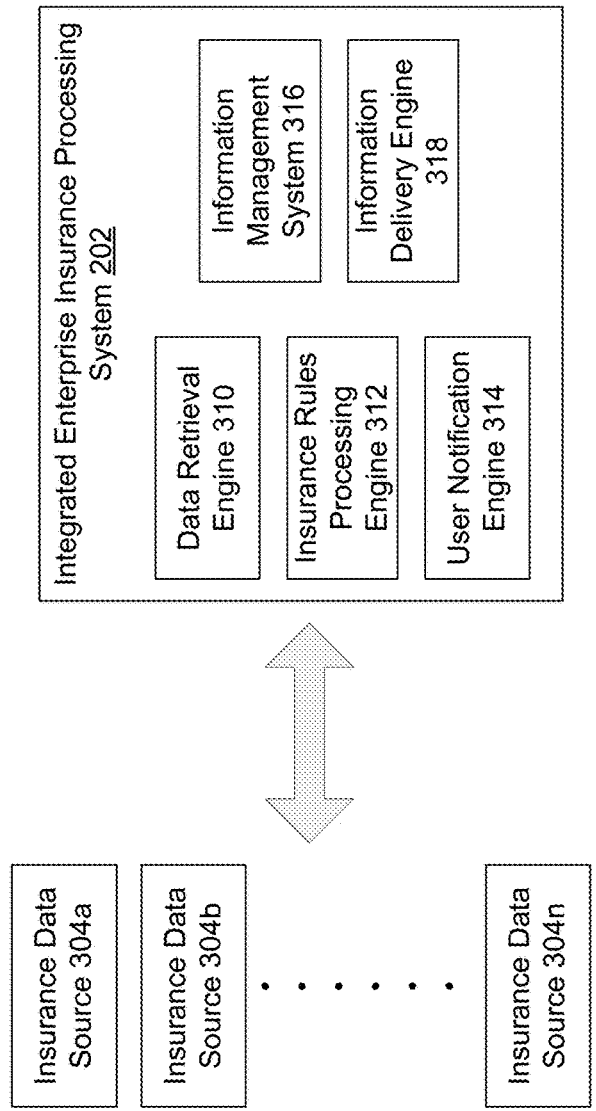
FIG. 3 illustrates a block diagram of a central processing unit that collects information from various insurance data sources to manage various different channels of communication with the insurance policyholder and insurance agents according to one or more aspects described herein.

FIG. 3 illustrates a block diagram 300 of a central processing unit that collects information from various insurance data sources to manage various different channels of communication with the insurance policyholder and insurance agents. As shown in FIG. 3, the IEIPS 202 may communicate with a plurality of insurance data sources 304a, 304b, . . . , 304n to collect information related to the policyholder to determine next steps to best serve the policyholder.

In some embodiments, the integrated enterprise insurance processing system 202 may retrieve information from the plurality of information data sources 304a-304n. For example, data retrieval engine 310 may be configured to monitor each of the insurance data sources 304a-304n and detect when new insurance data of interest to the integrated enterprise insurance processing system 202 at any one of these data sources.

In some embodiments, the integrated enterprise insurance processing system 202 may calculate insurance strategies based on the data gathered from the insurance data sources 304a-304n. For example, the insurance rules processing engine 312 may analyze the data retrieved from insurance data sources 304a-304n by the data retrieval engine 310 according to preset rules and/or algorithms.

In some embodiments, the integrated enterprise insurance processing system 202 may determine when and through which means to notify an insurance policyholder according to preset rules and strategies calculated from the data gathered from the insurance data sources 304a-n. For example, the user notification engine 314 may determine a time to contact the insurance policyholder with a message and/or notification generated by the integrated enterprise insurance processing system 202 upon analyzing the activities of the insurance policyholder and processing such activities according to insurance strategies maintained by integrated enterprise insurance processing system 202.

In some embodiments, the integrated enterprise insurance processing system 202 may manage the various activities of each insurance policyholder, insurance agent, and the status of the insurance claims filed by the insurance policyholder. For example, the information management system 316 may keep track of all of the information received from insurance data sources 304a-304n and may also manage a schedule of message delivery by communicating with the user notification engine 314.

In some embodiments, the integrated enterprise insurance processing system 202 may determine which channel to use to communicate the decision of a strategy computed at the integrated enterprise insurance processing system 202. For example, the information delivery engine 318 may detect which mobile application accessible to the user is the most appropriate channel on which to deliver the type of information that is scheduled to be delivered to the insurance policyholder, insurance agent, and/or other target audience.

Figure 4:
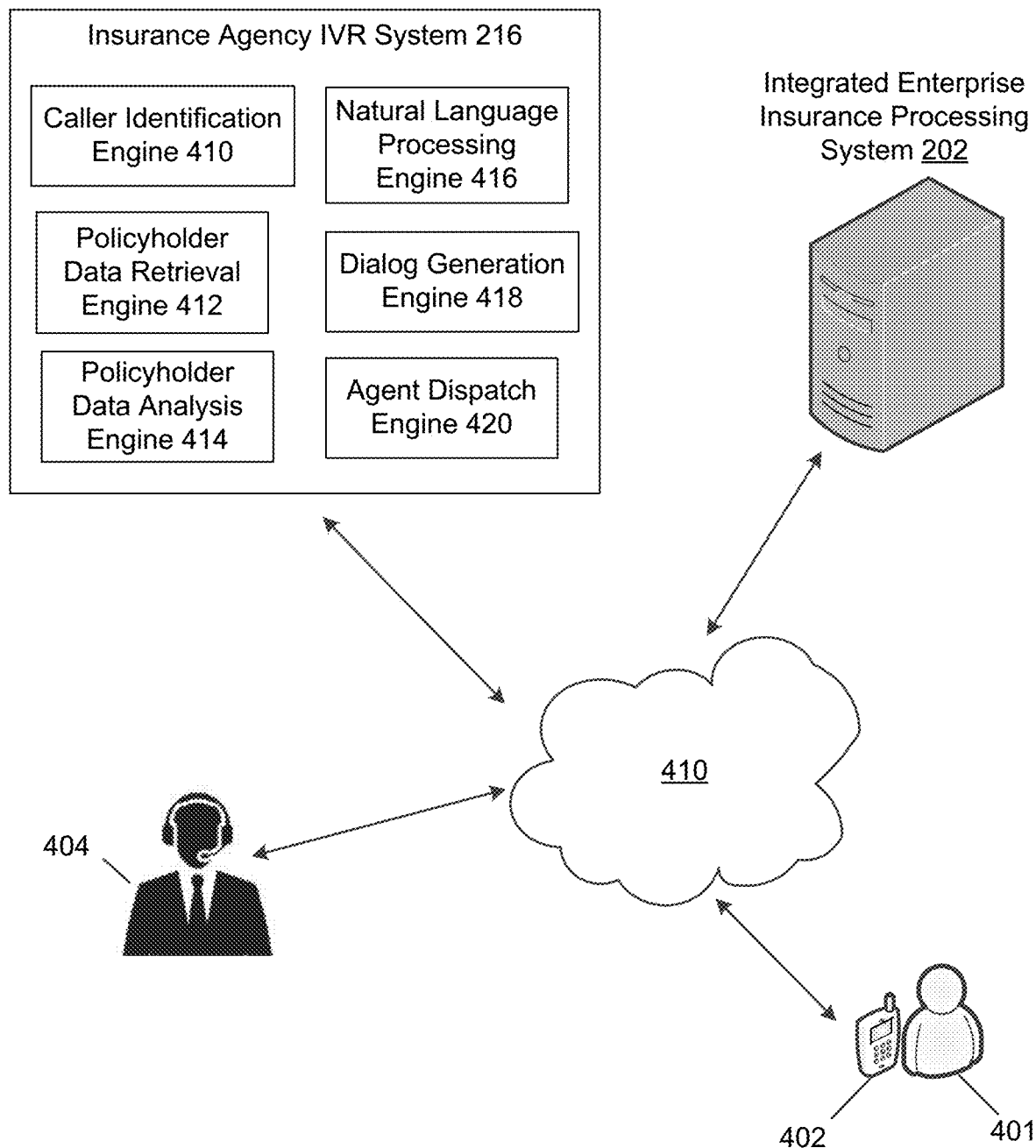
FIG. 4 illustrates an example environment in which an interactive voice response system provides customized insurance information to an insurance policyholder according to one or more aspects described herein.

FIG. 4 illustrates an example environment 400 in which an insurance agency interactive voice response system 216 provides customized insurance information to an insurance user 401. The insurance user 401 may be an insurance policyholder or a prospective customer for the insurance organization. The insurance agency IVR system 216 may receive an incoming call from the insurance user 401's telephone 402. An insurance user 401's call to the insurance organization may be routed to the insurance agency IVR system 216 to assist the insurance user 401 with a customized IVR menu and/or dialog that is customized based on the insurance policyholder's preferences. In order to customize the IVR menu options for the insurance user 401, the insurance agency IVR system 216 may communicate, over network 410, with the integrated enterprise insurance processing system 202 to determine the recent activities related to insurance that the insurance user 401 has been engaged in. After the insurance agency IVR system 216 determines that the insurance user 401 will be best served by talking to an insurance agent, the insurance agency IVR system 216 may place the insurance user 401 in communication with insurance agent 404. The insurance agency IVR system 216 may provide the insurance agent 404 with relevant information about the insurance user 401. At this time, the integrated enterprise insurance processing system 202 may also provide the insurance agent 404 with strategic recommendations to make to the insurance policyholder to best serve both the interests of the insurance user 401 and the insurance organization.

In some embodiments, some or all portions of the insurance agency IVR system 216 and/or the integrated enterprise insurance processing system 202 may be referred to as an IVR computing device. The IVR computing device may be one or more computing devices that perform functions described throughout the disclosure as being performed by the insurance agency IVR system 216 in coordination with the integrated enterprise insurance processing system 202.

In some embodiments, the insurance agency IVR system 216 may be included partially or fully in the integrated enterprise insurance processing system 202 and may communicate directly with the insurance user 401 and the insurance agent 404 over network 401. In other embodiments, the insurance agency IVR system 216 may be a separate entity from the integrated enterprise insurance processing system 202 and may be communicate with the integrated enterprise insurance processing system 202 to seek information about the insurance user 401 to improve the customization of the IVR menu that it may generate. Additionally or alternatively, the insurance agency IVR system 216 may report the information gathered from the insurance policyholder during an automated dialog to integrated enterprise insurance processing system 202. The integrated enterprise insurance processing system 202 may use such real-time information reported from the insurance agency IVR system 216 to improve its strategic decisions and/or affect change in other insurance channels that it manages with data from the automated dialog between the insurance agency IVR system 216 and the insurance user 401 and/or from the dialog between the insurance agent 404 and the insurance user 401.

In some embodiments, the insurance agency IVR system 216 may identify the insurance policyholder from the incoming call. For example, the caller identification engine 410 of the insurance agency IVR system 216 may identify the insurance policyholder using information about the telephone/and or mobile device 402 from which the incoming call is received at the insurance agency IVR system 216.

In some embodiments, the insurance agency IVR system 216 may retrieve insurance information from the integrated enterprise insurance processing system 202 about the insurance user 401 and any strategic recommendations that the insurance organization has made with regard to the insurance user 401 in order to customize the automated response to the incoming call from the insurance user 401. For example, the policyholder data retrieval engine 412 may request information from the integrated enterprise insurance processing system 202 about recent activities of the insurance user 401 to generate an automated dialog based on topics that the insurance policyholder is likely to be interested in.

In some embodiments, the insurance agency IVR system 216 may analyze information retrieved from the integrated enterprise insurance processing system 202 about the insurance user 401 in order to structure an IVR menu and automated dialog to answer the incoming call from the insurance user 401. For example, the policyholder data analysis engine 414 may parse through all the recent interactions of the user 401 to identify which particular insurance topics may be of immediate interest to the insurance user 401. For example, if a user recently visited a webpage for auto insurance policy quotes for a particular type of vehicle, then the engine 414 may determine that an item of interest is vehicle insurance. In another example, if a user requested information about life insurance through an application on a mobile smartphone, then the engine 414 may determine that an item of interest is life insurance.

In some embodiments, the insurance agency IVR system 216 may generate an automated dialog based on the information identifies to be of interest to the insurance user 401. The automated dialog may be generated using the dialog generation engine 418 and the natural language processing engine 416. The dialog generation engine 418 may generate an automated dialog strategy based on the identified items of interest to the insurance user 401 determined by the policyholder data analysis engine 414 and any input from the user 401. User inputs from the user 401 may be processed by an automatic speech recognition algorithm and may be processed by the natural language processing engine 416 to translate the speech input into concepts that can be easily parsed and understood by the insurance agency IVR system 216.

In some embodiments, the insurance agency IVR system 216 may inform the insurance agent 404 with information about the user retrieved from the integrated enterprise insurance processing system 202 and analyzed by the policyholder data analysis engine 414. For example, the agent dispatch engine 420 may find an available insurance agent and based on the context of the automated dialog between the user 401 and the insurance agency IVR system 216, the agent dispatch engine 420 may redirect user 401 to speak with agent 404. The insurance agency IVR system 216 may further provide the insurance agent 404 with information about the user 401 and/or strategic recommendations to provide the user 401 based on the user 401's recent activities and determined items of interest. For example, the insurance agency IVR system 216 may instruct a computing device used by the agent 404 to display one or more messages/GUI display windows with information regarding the previous activities of the user 401 and/or strategic recommendations that the insurance organization (e.g., the integrated enterprise insurance processing system 202) has recommended be made to the user 401 based on an analysis of insurance information that the user 401 has been determined to be interested in.

In some embodiments, the integrated enterprise insurance processing system 202 may determine when an agent or an automated call using the insurance agency IVR system 216 may be appropriate. Insurance agent 404 and the insurance agency IVR system 216 may be two different channels to communicate with a user 401 out of a plurality of different channels at the disposal of the insurance processing system 202. The insurance processing system 202 may determine when a phone conversation with the user 401 will be helpful based on the user 401's preferences and the activities that the user 401 is engaged in. For example, if the integrated enterprise insurance processing system 202 determines from analyzing user preferences that the user 401 does not prefer receiving phone calls during a certain time window (e.g., business hours) or does not respond favorably to phone calls in general but does respond favorably to information presented through other channels (email, mobile application notifications etc.), the integrated enterprise insurance processing system 202 may weight such factors against an urgency determined by the insurance processing system 202 with which to notify the user 401 of a particular message. For example, if the integrated enterprise insurance processing system 202 determines that the user 401 has partially or fully cancelled their insurance policy with the insurance organization and may be switching over to a competitor's policy, the integrated enterprise insurance processing system 202 may increase the urgency with which an agent/insurance agency IVR system 216 must contact the user 401 to persuade them to renew their policy/stay as a customer of the insurance organization.

In some embodiments, the integrated enterprise insurance processing system 202 may determine what insurance activity the user 401 is most interested in. By monitoring the user's interactions with multiple different insurance channels (e.g., the policyholder side insurance claims mobile application 206, the consumer insurance mobile application 218, the insurance web application 224, the insurance agency server 228, insurance policyholder account information system 226, the cyber-traffic event analysis system 222, and the insurance agency interactive voice response system 216, etc.), the integrated enterprise insurance processing system 202 may detect the activities of the user 401 either with each of these channels or as reported by each of these channels. The integrated enterprise insurance processing system 202 may additionally place more emphasis on recent activities (e.g., user interactions within a predetermined period of time) than on much older user interactions. The integrated enterprise insurance processing system 202 may identify from such user activities of user 401, what insurance services and/or policy changes the user 401 is interested in. The integrated enterprise insurance processing system 202 may also detect if the user is interested in making account changes to a previously existing coverage (e.g., cancel, renew, or modify the terms of an existing insurance policy) based on the nature of his interactions. For example, by monitoring the user's 401 clickstream sequence within insurance web application 224, the integrated enterprise insurance processing system 202 may detect that the user 401 is interested in modifying his/her policy. Further data recorded from the insurance web application 224 and/or reported from a cyber-traffic event analysis system 222 may inform the integrated enterprise insurance processing system 202 that the user is engaged in making modifications to their account. For example, if the user 401 is interacting with policy change features to their account and/or policy through an online portal such as insurance web application 224 and/or consumer insurance mobile application 218, the integrated enterprise insurance processing system 202 may become aware of such activity. The integrated enterprise insurance processing system 202 may further request additional information from these insurance channels (e.g., insurance web application 224 and/or consumer insurance mobile application 218) regarding the frequency and times at which the user 401 has been engaged in making these changes.

After the integrated enterprise insurance processing system 202 determines that the insurance user 401 may be interested in changing their current policy and/or performing some change to their insurance account, the integrated enterprise insurance processing system 202 may also instruct other channels such as cyber-traffic event analysis system 222 to detect whether the user 401 has been browsing a competitor's website and to determine how engaged the user 401 is with regards to that particular insurance activity. The integrated enterprise insurance processing system 202 may instruct the agent 404 and/or the insurance agency IVR system 216 to query the user about how interested they are in their competitors' offerings and understand the reason why the user 401 may be interested in the competitors. Such information gathered by the agent 404 and/or the insurance agency IVR system 216 may be used by the integrated enterprise insurance processing system 202 to determine what factors would compel the user 401 to move forward with the activity that they are interested in (e.g., policy change). The integrated enterprise insurance processing system 202 may use such factors along with insurance rules (e.g., by the insurance rules processing engine 312 of FIG. 3) of the insurance organization to better incentivize the user 401 to choose an option that is mutually beneficial for both the insurance organization and the insurance user 401. For example, the integrated enterprise insurance processing system 202 may determine, upon analyzing the user interactions and the user account information of user 401, that the user 401 may qualify to receive a promotion upon renewing their policy and/or receive a bulk discount on additional insurance policies that the user 401 may purchase for other properties. The integrated enterprise insurance processing system 202 may make various strategic decisions such as this by consulting the account information and/or account history of the insurance 401 and consulting the insurance rules of the insurance organization to better serve the user's 401 interests. Such strategies and/or incentives may be communicated to the user through one of various different insurance channels (e.g., the policyholder side insurance claims mobile application 206, the consumer insurance mobile application 218, the insurance web application 224, the insurance agency server 228, insurance policyholder account information system 226, the cyber-traffic event analysis system 222, and the insurance agency interactive voice response system 216, etc.) upon determining which channel the user 401 is available (or prefers) to receive such information.

In some embodiments, the integrated enterprise insurance processing system 202 may monitor the insurance 401's activity regarding insurance policy changes during an online session. If the integrated enterprise insurance processing system 202 detects that the user is browsing through policy changes and engaged in making changes but detects that the user 401 does not complete making the changes and/or cancels the changes that he has made, the integrated enterprise insurance processing system 202 may determine that the insurance user 401 should be contacted by the insurance agent 404 to discuss such changes within a predetermined period of time. The integrated enterprise insurance processing system 202 may also determine a time and mode of communication that the user 401 is most interested in receiving such a communication from the insurance organization.

In some embodiments, the integrated enterprise insurance processing system 202 may instruct the insurance agency IVR system 216 to present the insurance user 401 with various IVR menu options corresponding to the various insurance items determined to be of interest to the user 401. By monitoring various user inputs within a predetermined amount of time, the integrated enterprise insurance processing system 202 and/or the policyholder data analysis engine 414 of the insurance agency IVR system 216 may determine that a weighting of each of the different determined items of interest to the user 401. In determining such weighting, the integrated enterprise insurance processing system 202 and/or the policyholder data analysis engine 414 may also consider the level of importance that each of the determined items of interest to user 401 has to the insurance organization. After each of the items of interest have been weighted, the insurance agency IVR system 216 may generate an automated dialog routine/IVR option corresponding to each of the items of interest and present it to the user 401 when the user 401 calls the insurance agency and/or a number associated with the insurance organization. Each of the IVR menu options may be ordered in the IVR menu according to the relative weighting of their corresponding insurance item of interest.

In some embodiments, the integrated enterprise insurance processing system 202 may constantly monitor the insurance user 401's activities to dynamically update the IVR menu options. For example, if the integrated enterprise insurance processing system 202 detects, after generating an ordered IVR menu, that the insurance user 401 has engaged in another activity recently, the integrated enterprise insurance processing system 202 may determine the weighting of such an activity and may further determine whether the determined item of interest corresponding to the new user activity is different from the items of interest corresponding to the currently generated IVR menu options. Upon determining that the new user activity corresponds to a new item of interest and potentially a new IVR menu option, the integrated enterprise insurance processing system 202 may determine the weighting of such a new determined item of interest and generate a corresponding IVR menu option and automated dialog to present to the user 401 through the insurance agency IVR system 216. The integrated enterprise insurance processing system 202 may also instruct the insurance agency IVR system 216 to reorder the IVR menu options based on the introduction of the new IVR menu option. In such a manner, the integrated enterprise insurance processing system 202 may constantly monitor and dynamically update the IVR menu to match the user's current interests so that when a user 401 calls the insurance agency, the insurance agency IVR system 216 and/or the insurance agent 404 will know what the user 401 is currently most likely to be interested in discussing.

Figure 5:
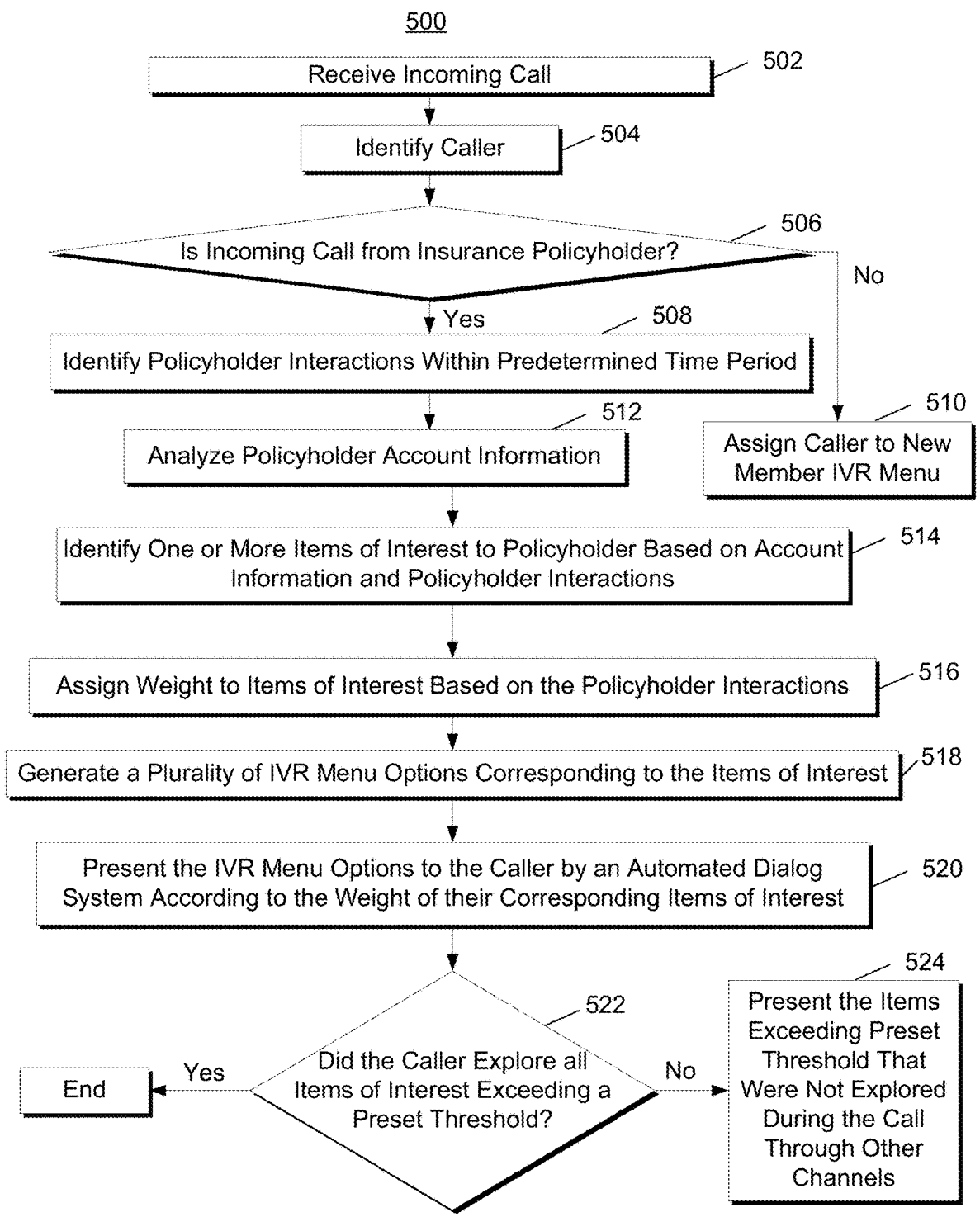
FIG. 5 illustrates a flow chart illustrating an example method of providing customized insurance information to an insurance policyholder based on the recent activities of the policyholder according to one or more aspects described herein.

FIG. 5 illustrates a flow chart illustrating an example method 500 of providing customized insurance information to an insurance policyholder based on the recent activities of the policyholder. In some embodiments, the steps of method 500 may be performed by a computing device such as integrated enterprise insurance processing system 202 of FIG. 2-4 and/or insurance agency IVR system 216 of FIGS. 2 and 4.

At step 502, an incoming call may be received at an insurance agency and detected by the computing device. The computing device may detect that a phone number associated with the insurance organization is currently receiving an incoming call. The computing device may further identify information identifying the caller (e.g., the phone number of the caller, the location from which the call is being received, and/or the IP address associated with an incoming VOIP call).

At step 504, the computing device may identify the caller. The computing device may use the information identifying the caller (e.g., the phone number of the caller, the location from which the call is being received, and/or the IP address associated with an incoming VOIP call) to search a database of user information including such contact information for each of its insurance policyholders to identify the caller.

At step 506, the computing device may determine whether the incoming call is from an insurance policyholder or from a prospective customer. By using the information identifying the caller (e.g., the phone number of the caller, the location from which the call is being received, and/or the IP address associated with an incoming VOIP call) and using such information to search a database of known contact information for an insurance organization's policyholders, the computing device may determine whether the incoming call is from a policyholder or a number that is not associated with any known policyholders and/or insurance agents/phone numbers internal to the insurance organization.

At step 508, in response to determining that the incoming call is from an insurance policyholder, the computing device may identify the policyholder's interactions within a predetermined period of time. For example, the computing device may identify all activities of the insurance policyholder reported by the various different insurance channels and/or data sources monitored by the computing device that include data on user interactions within a predetermined period of time. Each of these data sources (e.g., the policyholder side insurance claims mobile application 206, the consumer insurance mobile application 218, the insurance web application 224, the insurance agency server 228, insurance policyholder account information system 226, the cyber-traffic event analysis system 222, and the insurance agency interactive voice response system 216 of FIG. 2, etc.) may report to the computing device real-time information about interactions that the user engages in.

At step 510, in response to determining that the incoming call is from a prospective insurance customer, the computing device may assign the caller to a new member IVR menu. If the computing device determines that the insurance user's contact information does not match that of any policyholders' the computing device may instruct an IVR system to respond to the incoming call with an automated new customer IVR menu that engages the incoming caller with an automated IVR dialog to record information from the incoming caller and have the incoming caller sign on as a new policyholder. The computing device may also at this point instruct an insurance agent (e.g., insurance agent 404 of FIG. 4) to contact the incoming caller to have the incoming caller sign up as a policyholder of the insurance organization.

At step 512, the computing device may analyze the policyholder's account information to determine the policyholder's preferences and current policy coverage. For example, the computing device may identify which insurance policies the incoming caller has subscribed to. The computing device may identify the policyholder's account preferences (e.g., date and time the policyholder prefers to be contacted, the policyholder's preferences for a mode of contact, the policyholder's preferred language, etc.) and may identify information that an insurance agency IVR system and/or insurance agent would find useful in customizing an intelligent automated dialog with the policyholder (e.g., when to contact the user for a follow up, how to contact the user, the language in which to communicate with the policyholder, etc.).

At step 514, the computing device may identify one or more items of interest to the policyholder based on the analyzed account information, preferences, and recent interactions engaged in by the policyholder. By monitoring the user's interactions with multiple different insurance channels (e.g., the policyholder side insurance claims mobile application 206, the consumer insurance mobile application 218, the insurance web application 224, the insurance agency server 228, insurance policyholder account information system 226, the cyber-traffic event analysis system 222, and the insurance agency interactive voice response system 216 of FIG. 2, etc.), the computing device may detect the activities of the policyholder. The computing device may additionally place more emphasis on recent activities (e.g., user interactions within a predetermined period of time) than on much older user interactions. The integrated enterprise insurance processing system 202 may identify from such user activities of the policyholder, what insurance services and/or policy changes the policyholder may be interested in. The computing device may also determine if the user is interested in making account changes to a previously existing coverage (e.g., cancel, renew, or modify the terms of an existing insurance policy) based on the nature of his interactions. The computing device may further request additional information from the various insurance channels accessed by the policyholder (e.g., insurance web application 224 and/or consumer insurance mobile application 218 of FIG. 2) regarding the frequency and times at which the policyholder has been engaged in making these changes. In addition to policy changes, the computing device may also identify other activities that the policyholder is engaged in within a predetermined amount of time. For example, if the insurance policyholder has gotten into an automobile accident and/or filed an insurance claims request for an insured property within a predetermined period of time in the past, the computing device may identify that the policyholder may be interested in learning about the status of his insurance claim and/or the insurance options available to him regarding his recent automobile accident.

At step 516, the computing device may assign weighting to the various determined items of interests based on the recent interactions engaged in by the policyholder. Upon identifying the items of determined interest to the policyholder/caller, the computing device may determine the relative level of interest that the policyholder may have towards each of the identified items. In order to determine such a weighting, the computing device may identify the frequency with which the policyholder has been engaged in activities related to corresponding item of interest and the level of importance that the determined item of interest has for the insurance organization.

At step 518, the computing device may generate a plurality of natural language IVR menu options corresponding to the determined items of interest. Upon determining the identified items of interest to the policyholder based on the policyholder's recent activities, the computing device may generate or instruct an IVR system to automatically generate IVR menu options to present to the incoming caller. Each of the IVR menu options may correspond to each of the identified items of interest to the caller/policyholder. An automated dialog/IVR conversation may be generated for each of the IVR menu options if the caller selects any one of the IVR menu options and provides further information the insurance agency IVR system for a selected IVR menu option. The computing device may be configured to collect information provided by the caller/policyholder in response to the automated dialog conducted by the computing device and/or the insurance agency IVR system and process such information to further update the user's preferences, update the list of interactions that the policyholder has recently engaged in, and/or update the strategies calculated by the computing device using pre-existing data collected from the policyholder. Each of the generated IVR menu option and the corresponding dialog may be processed by a natural language processing algorithm to ensure that the IVR menu options and the related automated dialog are syntactically correct. Accordingly, the speech inputs received from the policyholder may be processed by a natural language algorithm to map the input to correspond to concepts and software constructs understood by the computing device.

At step 520, the computing device may present the generated natural language IVR menu options to the caller by an automated dialog system according to the weight of their corresponding items of interest. After a plurality of IVR menu options have been generated, the computing device may order each of the generated IVR menu options for presentation to the caller in response to the incoming call in an order corresponding to the weighting of the item of determined interest to the policyholder that each IVR menu option corresponds to. Additionally or alternatively, the computing device may present, to the caller in response to answering the incoming call, only the IVR menu options that correspond to items of interest to the user that exceed a predetermined threshold weighting set by the insurance organization.

At step 522, the computing device may determine whether the caller has explored all determined items of interest having a weighting that exceeds a predetermined threshold. The computing device may track which IVR menu options that caller selects and conducts a dialog for. For example, the computing device may monitor which IVR menu options the computing device and/or the insurance agency IVR system receives user feedback for and thereby may determine that the caller has explored these IVR menu options.

In response to determining that the caller has explored all determined items of interest having a weighting that exceeds a predetermined threshold, the method 500 may terminate and the automated IVR system may be instructed to terminate the call.

In response to determining that the caller has not explored all determined items of interest having a weighting that exceeds a predetermined threshold during the automated dialog with the automated IVR system, the computing device may present the determined items of interest exceeding the preset threshold weighting that were not explored during the call with the IVR system through other channels of communication with the user/caller. For example, the computing device may determine which other channels of communicating the items of interest best matches the policyholder's preference for receiving the type of information corresponding to the each of the identified items of interest to be communicated to the policyholder.

Figure 6:
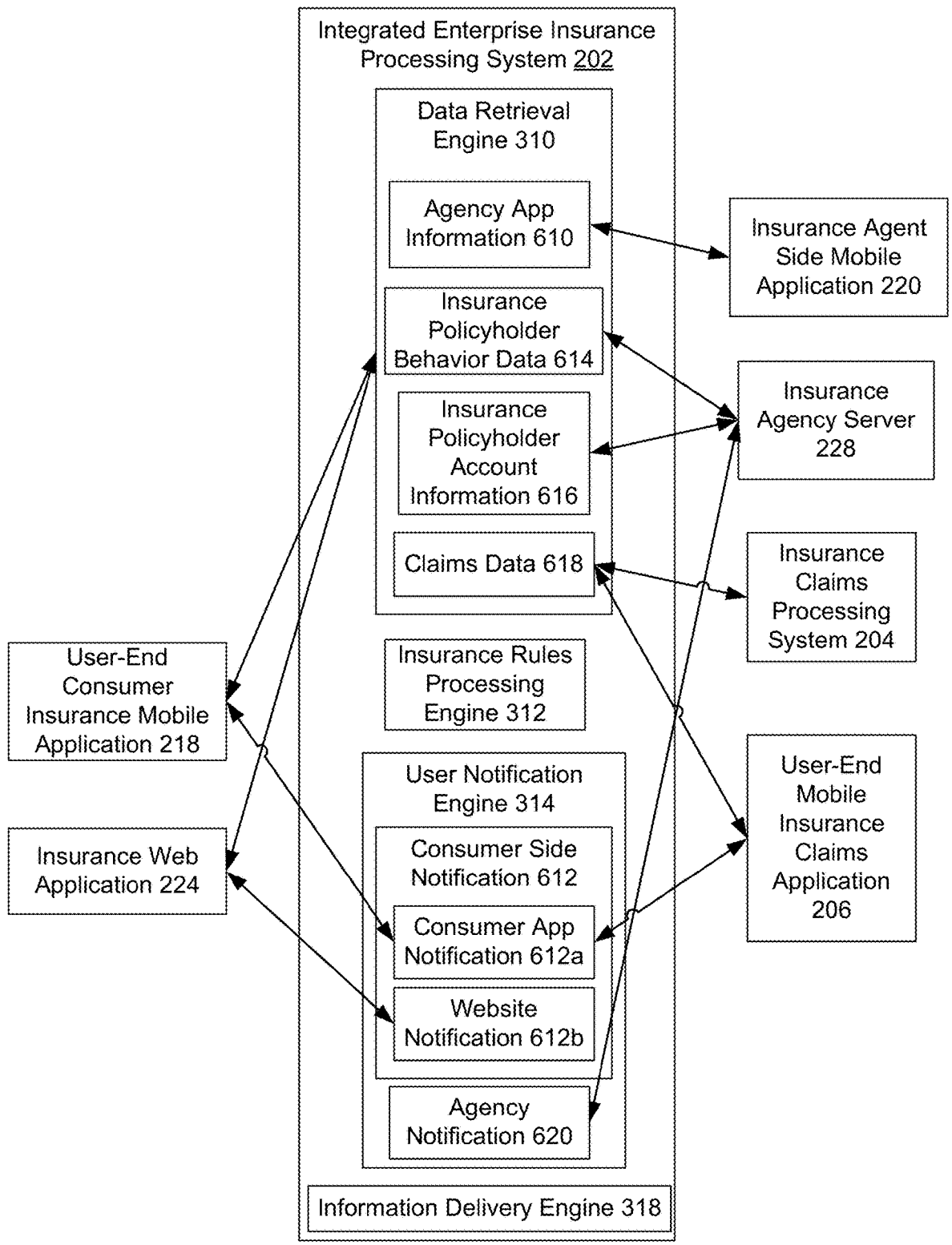
FIG. 6 illustrates a block diagram of a central processing unit that collects information from various insurance data sources to manage various different channels of communication with the insurance policyholder and insurance agents according to one or more aspects described herein.

FIG. 6 illustrates a block diagram 600 of a central processing unit that collects information from various insurance data sources to manage various different channels of communication with the insurance policyholder and insurance agents. The integrated enterprise insurance processing system 202 may monitor user interactions and/or events reported by one or more of the insurance agent side mobile application 220, user-end consumer insurance mobile application 218, insurance web application 224, insurance agency server 228, insurance claims processing system 204, and the user-end mobile insurance claims application 206. Each of the insurance agent side mobile application 220, user-end consumer insurance mobile application 218, insurance web application 224, insurance agency server 228, insurance claims processing system 204, and the user-end mobile insurance claims application 206, may be referred to hereinafter as insurance information channels. By identifying and analyzing activity occurring within and/or activity that is reported by each of these insurance information channels, either alone or in conjunction with other insurance information retrieved by the integrated enterprise insurance processing system 202, the integrated enterprise insurance processing system 202 may generate strategic recommendations and/or decisions to be provided to a policyholder and/or an insurance agent. The integrated enterprise insurance processing system 202 may further determine which insurance information channel would be the most appropriate channel for delivering such strategic recommendations and/or decisions to its target audience. Upon determining which information channel(s), the strategic recommendation/decision is to be delivered in, the integrated enterprise insurance processing system 202 may further format the strategic recommendation/decision into a message/notification/application feature in a format suitable for presentation in the determined destination insurance information channel.

In some embodiments, as shown in FIG. 6, the integrated enterprise insurance processing system 202 may retrieve insurance information from a variety of insurance information channels. For example, the data retrieval engine 310 may communicate with user-end consumer insurance mobile application 218 to monitor an insurance user's activity on the mobile application 218. The integrated enterprise insurance processing system 202 may monitor the activities of the insurance user and may collect information based on the user's interactions with the customer insurance mobile application 218. The integrated enterprise insurance processing system 202 may detect events that the user may have triggered within the customer insurance mobile application 218 and may maintain a record of such user initiated activities (e.g., that occur within a predetermined amount of time) as insurance policyholder behavior data 614. The integrated enterprise insurance processing system 202 may determine what the insurance user is viewing within the context of the customer insurance mobile application 218 and interacting with (e.g., by determining the amount of time that a user spends browsing a particular GUI display of the customer insurance mobile application 218). For example, the integrated enterprise insurance processing system 202 may determine that an insurance user having logged into his account on a customer insurance mobile application 218 may be browsing through different automobile insurance policies offered by an insurance company associated with the integrated enterprise insurance processing system 202. The integrated enterprise insurance processing system 202 may further determine, by monitoring the user's clickstream activities on the mobile application 218, that the insurance user is interested in changing his currently subscribed automobile insurance policy to decrease his monthly premium payment. By determining that the user has spent five minutes browsing the details of different automobile policies, and calculated estimated policy premium prices in the mobile application 218 by modifying different terms of prospective automobile policies, the integrated enterprise insurance processing system 202 may determine that the insurance user may be interested in modifying the terms of his automobile insurance policy. The integrated enterprise insurance processing system 202 may make a note of the insurance user's activities in the mobile application 218 and determine that decreasing automobile insurance policy premiums is an item of interest for the corresponding insurance user. Information indicating an insurance user's identified item of interest may be stored as insurance policyholder behavior data 614.

In some embodiments, the integrated enterprise insurance processing system 202 may collect information about the user's activities and behaviors through multiple different insurance information channels. For example, the integrated enterprise insurance processing system 202 may collect information on the insurance user from the insurance web application 224 as well as from the user-end consumer insurance mobile application 218. The integrated enterprise insurance processing system 202 may simultaneously monitor all insurance information channels that are registered with a user's account for activities and/or events indicating the insurance user's interest and/or actions. For example, in addition to monitoring the user's activity indicating interest in changing his policy on the mobile application 218, the integrated enterprise insurance processing system 202 may monitor the insurance user's activities on the insurance web application 224 related to modifying the terms of the automobile insurance policy. As an example, the insurance web application may present to the insurance user a survey querying the insurance user's level of interest in a competitor's insurance policy. Additionally or alternatively, the integrated enterprise insurance processing system 202 may determine the insurance user's level of interest in a competitor's insurance policy through the insurance web application 224. For example, the insurance web application 224 may monitor the user's activities and process such activities using potential defection techniques to determine whether the user is interested in a competitor's policies. As an example, the insurance web application 224 may prompt the user to answer questions regarding how satisfied they are with the current insurance organization's policies and identify which aspects of their competitors' insurance policy their insurance policyholders are interested in. The integrated enterprise insurance processing system 202 may record this information from the insurance web application 224 once the insurance user enters such information into the insurance web application 224. The integrated enterprise insurance processing system 202 may store such information in the insurance policyholder behavior data 224.

In some embodiments, the integrated enterprise insurance processing system 202 may store account information and information learnt from an insurance user about their preferences as insurance policyholder account information 616. The integrated enterprise insurance processing system 202 may detect when an insurance user enters information indicating his preferences and/or information describing himself and accordingly may store such information and/or information derived from such user input information as the insurance policyholder account information 616. Such information may be detected by the integrated enterprise insurance processing system 202 by monitoring activities from various insurance information channels (e.g., the insurance web application 224, the user-end consumer insurance mobile application 218, the insurance agent side mobile application 220, the insurance agency server 228, the user-end insurance claims mobile application 206, and the insurance claims processing system 204, etc.).

In some embodiments, the integrated enterprise insurance processing system 202 may collect insurance claims information from the insurance user and/or an insurance agency. For example, the integrated enterprise insurance processing system 202 may monitor any new insurance claims information entered into the user-end insurance claims mobile application 206 by the insurance user and may update the insurance claims data 618 to reflect the addition of such insurance claims information. The integrated enterprise insurance processing system 202 may also detect such information from the insurance agency server 228 and/or the insurance claims processing system 204. For example, when an insurance agent files and/or processes an insurance claim for an insurance policyholder, the details of the insurance claim may be added to the insurance agency server 228 and/or the insurance claims processing system 204 by the insurance agent. As soon as such information becomes available on the insurance agency server 228 and/or the insurance claims processing system 204, the integrated enterprise insurance processing system 202 may retrieve such claims information and update the claims data 618 for the corresponding insurance policyholder.

In some embodiments, the integrated enterprise insurance processing system 202 may retrieve information from one or more insurance agents about the insurance users that they have interacted with. For example, insurance agents providing customer service for an insurance organization may upload information discussed with the insurance user into the insurance users' file on the insurance agency server 228 for future reference and/or data analysis/data mining. Additionally or alternatively, insurance agents that inspect an insurance user's insured property may report the status of the insured property through an insurance agent side mobile application 220. The insurance agent side mobile application 220 may be updated with any other type of information about an insurance user that an insurance agent notes from their interaction with an insurance user. Such information may be retrieved by the integrated enterprise insurance processing system 202 and stored as agency application information 610.

In some embodiments, the integrated enterprise insurance processing system 202 may make a strategic insurance decision and/or recommendation based on the information that it may have retrieved. For example, the insurance rules processing engine 312 may determine by analyzing any one or more pieces of information obtained by the data retrieval engine 310 (e.g., agency application information 610, insurance policyholder behavior data 614, insurance policyholder account information 616, and claims data 618) a strategic decision according to preset rules specified by the insurance organization. The insurance organization may have specified that if a certain type of information is detected by the integrated enterprise insurance processing system 202, a particular type of action may be taken as a result. For example, upon determining that the insurance policyholder is browsing options to change his automobile insurance policy but has not completed making such changes, the integrated enterprise insurance processing system 202 may determine what incentives the insurance policyholder is eligible for that would benefit both the insurance policyholder and the insurance organization. The integrated enterprise insurance processing system 202 may provide the insurance policyholder such incentives in order to help persuade the insurance policyholder to complete making a policy change to the insurance policy that may be beneficial to the insurance organization.

In some embodiments, the insurance rules processing engine 312 may determine that particular actions are to be taken if a particular type of information comes in from a particular insurance information channel. For example, the integrated enterprise insurance processing system 202 may determine that an insurance policyholder is to be contacted within an hour for a follow up discussion with an insurance agent if information regarding the user's desire to change insurance policy providers is received from the user-end consumer insurance mobile application 218. If the same information is received through the insurance web application, however, the insurance rules processing engine 312 may determine that the insurance policyholder is to be contacted within 24 hours. The insurance rules processing engine 312 may determine that changes being contemplated on the user-end consumer insurance mobile application 218 may indicate that the insurance user is more typical to act more quickly than if he had contemplated making the same policy changes over the insurance web application 224. Additionally or alternatively, the integrated enterprise insurance processing system 202 may only determine to notify the user with particular information if such an information is retrieved by more than one insurance information channel. For example, if the integrated enterprise insurance processing system 202 determines from both the user-end consumer insurance mobile application 218 and one or more of the insurance agency server 228, the insurance web application 224, and the insurance agent side mobile application 220 report that the insurance user has expressed an interest in a competitor's policy, the integrated enterprise insurance processing system 202 may determine that the insurance policyholder is to be contacted within 24 hours with incentives to keep their business.

In some embodiments, the integrated enterprise insurance processing system 202 may determine which insurance information channel to modify based on the strategic decision and/or recommendation that was determined. The insurance policyholder may also take into account the user preferences in determining which insurance information channel to use and/or modify. For example, the user notification engine 314 may determine that communications to the insurance user that involve persuading the user to select the insurance organization over its competitors should be conducted by an insurance agent and may accordingly instruct the insurance agency server 228 to have an agent contact the policyholder. If the insurance policyholder specifies that he wishes not to receive calls from the insurance organization during business hours and the integrated enterprise insurance processing system 202 determines that a notification incentivizing the user to stay with the insurance organization needs to be communicated within an hour (e.g., during business hours), the integrated enterprise insurance processing system 202 may determine that an application notification within the user-end consumer insurance mobile application 218 may be the most efficient way in which to reach the customer without violating his notification preferences.

In some embodiments, the integrated enterprise insurance processing system 202 may format the notifications differently based on the insurance information channel through which the notification is to be delivered to its target audience. For example, if a user-end customer insurance mobile application 218 is to deliver the notification that the insurance user qualifies for a rebate on their policy renewal because of their good standing, the integrated enterprise insurance processing system 202 may determine that a message may be generated in a rewards section of the mobile application 218. The user notification engine 314 may format a consumer application notification 612a in such a manner and deliver it to the user end consumer insurance mobile application 218. Additionally or alternatively, if such a notification is to be displayed to the insurance user through an insurance web application 224, a banner advertisement or a popup window with such a message may generated. The user notification engine 314 may format a website notification 612b in such a manner and deliver it to the insurance web application 224. However, if an insurance agent is to be instructed to notify the user with such a notification, the integrated enterprise insurance processing system 202 may generate a display on a computing device of an insurance agent's computing device at an insurance agency office. Such a display at the insurance agent's computing device may also display additional information (e.g., account information and past insurance activity of the insurance user) to the insurance agent in order for the insurance agent to have a productive conversation with the insurance user. The user notification engine 314 may format agency notification 620 in such a manner and deliver it to the insurance agency server 228.

In some embodiments, the integrated enterprise insurance processing system 202 may determine a timing and frequency with which to deliver notifications and/or perform certain actions in one of a plurality of the insurance information channels. For example, the information delivery engine 318 may determine when to generate a message/notification in the user-end consumer insurance mobile application 218 based on the determined urgency with which the message is to be delivered and/or the frequency with which the user checks the application. As an example, the information delivery engine 318 may determine that if an insurance user is detected to be interested in a competitor's insurance policies, a message describing a promotional discount that the insurance user is eligible for should be generated for display in the user-end consumer mobile application 218 immediately and if the user does not view such a message within a predetermined amount of time and/or make changes to his insurance policy within a predetermined amount of time after viewing such a message, the information delivery engine 318 may instruct an insurance agency server 228 to display a message on the computing device of an insurance agent in an insurance agency office to contact the insurance user during a time that the insurance user has specified that he prefers to be contacted.

In some embodiments, the integrated enterprise insurance processing system 202 may generate notifications in certain insurance information channels in response to real-time events detected by the user's mobile computing device. For example, the integrated enterprise insurance processing system 202 may monitor the location of the insurance user's mobile device. If the integrated enterprise insurance processing system 202 detects that the insurance user has walked into an insurance agency office/customer service location, the integrated enterprise insurance processing system 202 may notify one of the insurance agents working at such a location that the user has walked into their office. The integrated enterprise insurance processing system 202 may further display the user's account history and recent activities that the user has been engaged in on the computing device of the insurance agent at that particular agency office. The integrated enterprise insurance processing system 202 may also present the insurance agent with the recommended strategies and/or recommendations that have been generated for that particular insurance user who has just walked into the agency office based on an analysis of that insurance user's recent activities. The integrated enterprise insurance processing system 202 may automatically present such information on the screen of the computing device of an insurance agent as soon as the integrated enterprise insurance processing system 202 detects from the user mobile computing device's location is within range of the insurance agency office. This may allow the insurance agent to briefly review the history of the insurance user and be well informed of what the user may be interested in and what the insurance organization has determined should be recommended to the insurance user based on their activities before the insurance agent greets the insurance user who has just walked into the insurance agency office.

In some embodiments, a networked server computing device, such as integrated enterprise insurance processing system 202, may identify a plurality of different mobile applications that allow the networked server computing device to collect information on user interactions with graphic user interface elements of the mobile applications. For example, the integrated enterprise insurance processing system 202 may identify which mobile applications (e.g., user-end consumer insurance mobile application 218, insurance agent mobile application 220, insurance web application 224, etc.) allow the integrated enterprise insurance processing system 202 to monitor the user interactions within such mobile applications. The integrated enterprise insurance processing system 202 may perform in-app analytics by monitoring page views, user clickstream events, monitor how much time a user of the mobile application spends on each type of content within the mobile applications and how frequently the user accesses such content. The integrated enterprise insurance processing system 202 may identify which graphic user interface elements within each mobile application of the plurality of different mobile applications that the user interacts with. For example, the integrated enterprise insurance processing system 202 may identify that a user spends ten minutes browsing through a window displaying the user's policy terms and an extra five minutes browsing a policy premium estimation window with a consumer insurance mobile application 218. By monitoring such interactions of the user of each mobile application with the different mobile applications and insurance channels, the integrated enterprise insurance processing system 202 may determine a plurality of items of potential interest to a user associated with a first mobile application by analyzing the user interactions with the graphic user interface elements of the first mobile application. For example, the integrated enterprise insurance processing system 202 may determine that the user of the user-end consumer insurance mobile application 218 may be interested in reducing his insurance premiums by determining that the user spends the highest percentage of time in the last visit to the mobile application 218 experimenting with different policy premium calculations. Furthermore, in order to determine the items of potential interest to the user, the integrated enterprise insurance processing system 202 may determine the content of the graphic user interface elements with which the user of the first mobile application has interacted. For example, the integrated enterprise insurance processing system 202 may determine that the user has interacted for five minutes with a graphic user interface window with mobile application 218 that displays an insurance premium calculation tool. The integrated enterprise insurance processing system 202 may determine a frequency and number of times within a predetermined time period with which the user of the first mobile application interacts with the graphic user interface elements of the first mobile application. For example, the integrated enterprise insurance processing system 202 may determine that the user is interested in reducing his premium by determining that the user has engaged in interactions with the insurance premium calculation tools over 30% of the time that he has accessed mobile application 218 and that he uses this tool on an average of every 2 days.

In some embodiments, the networked computing device, such as integrated enterprise insurance processing system 202, may determine an insurance promotion related to a determined item of interest. For example, the integrated enterprise insurance processing system 202 may determine the different items that the user would be potentially interested in from monitoring the user's interactions with the various mobile applications and insurance channels determining if there is a promotion offered by the insurance organization for which the user would be eligible. In order to determine such a promotion, the integrated enterprise insurance processing system 202 may analyze information stored in an insurance account of the user, the user's insurance history, and the terms of an insurance policy coverage associated with the user. For example, the integrated enterprise insurance processing system 202 may analyze the user's insurance account history and determine that the user has paid his bills on time for the past five years and has been a good driver without any accidents for the past three years. Accordingly, the integrated enterprise insurance processing system 202 may determine by checking the insurance rules processing engine 312 that the user is eligible for an insurance premium reduction promotion for being a good driver and paying his bills on time.

In some embodiments, the networked computing device may select a mobile application from the plurality of mobile applications that it monitors to provide the insurance promotion to a user (e.g., insurance policyholder). The integrated enterprise insurance processing system 202 may determine what type of information the user accesses from each mobile application. For example, the integrated enterprise insurance processing system 202 may determine the types of information provided by the graphic user interface elements with which the user interacts in each of the plurality of mobile applications. The integrated enterprise insurance processing system 202 may determine the type of information provided by the insurance promotion. For example, the integrated enterprise insurance processing system 202 may determine that the insurance promotion is for reduction of an insurance premium. The integrated enterprise insurance processing system 202 may determine that the insurance promotion is a financial incentive promotion. The integrated enterprise insurance processing system 202 may further determine which mobile application comprises graphic user interface elements that provide the types of information that match the type of information provided by the insurance promotion. For example, the integrated enterprise insurance processing system 202 may determine that the insurance web application comprises graphic user interface elements for displaying financial promotions. The integrated enterprise insurance processing system 202 may also determine that the user uses insurance web application 224 to view insurance account related messages from the insurance organization and that the user uses the insurance web application 224 over other insurance channels and mobile applications to make changes to his account. In order to select the mobile application that is to be used to provide the insurance promotion, the integrated enterprise insurance processing system 202 may determine the various characteristics of each of the plurality of different mobile applications and determine which mobile application of the plurality of mobile applications comprises a maximum number of characteristics associated with the insurance promotion. For example, the integrated enterprise insurance processing system 202 may determine that the insurance promotion has the characteristics of financial account information, secure content, content that can be used to implement a change to the user's account, and that of a visually appealing message. Accordingly, the integrated enterprise insurance processing system 202 may determine that the insurance web application 224 is the only insurance channel and/or mobile application through which financial account is provided to a user, through which messages of a secure content are to be provided to the user, through which the user can implement changes to his account directly, and through which visually appealing messages can be delivered to the user. Upon determining that the insurance web application is the mobile application that best matches the characteristics of the insurance promotion, the integrated enterprise insurance processing system 202 may select the insurance web application 224 as the mobile application through which the insurance promotion is delivered to the user.

In some embodiments, the integrated enterprise insurance processing system 202 may modify the graphic user interface elements of the mobile application selected to deliver the insurance promotion to generate a display of the insurance promotion within the second mobile application. The integrated enterprise insurance processing system 202 may transmit information about the insurance promotion to a computing device on which the selected mobile application is executing. For example, the integrated enterprise insurance processing system 202 may deliver the text and/or graphics describing the insurance promotion to the mobile computing device(s) on which the insurance web application 224 is executing. The integrated enterprise insurance processing system 202 may instruct the selected mobile application (e.g., insurance web application 224) to generate a graphic user interface element comprising information about the insurance promotion.

In some embodiments, the integrated enterprise insurance processing system 202 may generate a plurality of different messages related to the insurance promotion to be provided to the user. For example, upon determining that an insurance promotion is to be delivered to an insurance policyholder, the integrated enterprise insurance processing system 202 may generate a first message congratulating the user that they are eligible for a premium reduction on their automobile insurance policy and a second message with information on higher claim deductible prices as a result of the premium reduction. The integrated enterprise insurance processing system 202 may select, from the plurality of different mobile applications, a destination mobile application to deliver each of the two different messages based on analyzing one or more characteristics of each of the plurality of different mobile applications. For example, while the integrated enterprise insurance processing system 202 may select the insurance web application to deliver the first message as described above, the integrated enterprise insurance processing system 202 may select the user-end mobile insurance claims application 206 to deliver the second message. The integrated enterprise insurance processing system 202 may determine that the user-end mobile insurance claims application 206 best matches the characteristics of the second message (e.g., claims related data, information about claims deductibles, etc.). Accordingly, the integrated enterprise insurance processing system 202 may transmit the first and the second message to their corresponding destination mobile applications. The integrated enterprise insurance processing system 202 may adjust the first and the second message into a format suitable for its corresponding destination mobile application. For example, the integrated enterprise insurance processing system 202 may identify that the user-end mobile insurance claims application 206 is written in a different programming language than the insurance web application 224 and accordingly the integrated enterprise insurance processing system 202 may format the first and the second message into the appropriate programming language of their destination mobile applications.

Figure 7:
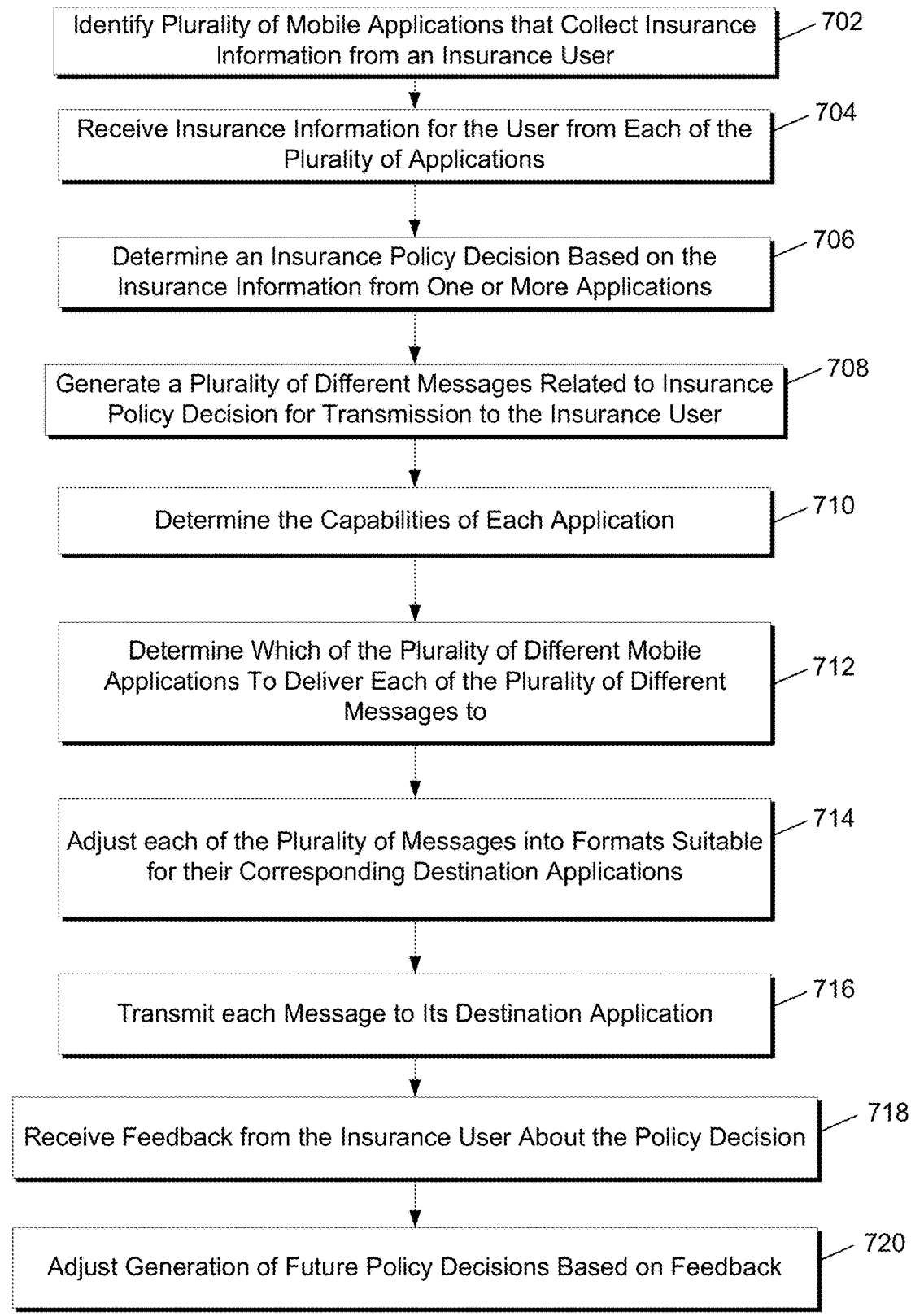
FIG. 7 is a flow chart illustrating an example method of generating and distributing insurance policy decisions based on information collected from various different applications according to one or more aspects described herein.

FIG. 7 is a flow chart illustrating an example method 700 of generating and distributing insurance policy decisions based on information collected from various different applications. In some embodiments, the steps of method 700 may be performed by a computing device such as integrated enterprise insurance processing system 202 of FIGS. 2-4 and 6.

At step 702, the computing device may identify a plurality of mobile applications that collect insurance information from a user. The computing device may identify all of the different insurance information channels that is has access to. For example, the computing device may identify that it has access to various insurance information channels such as the insurance web application 224, the user-end consumer insurance mobile application 218, the insurance agent side mobile application 220, the insurance agency server 228, the user-end insurance claims mobile application 206, and the insurance claims processing system 204 as described in FIG. 2. The computing device may identify what type of data to retrieve from each of these channels. For example, the computing device may determine that new data, when generated by the user-end insurance claims mobile application, may correspond to details about a new and/or preexisting insurance claim corresponding to an insurance user logged into that particular account of the insurance claims mobile application.

At step 704, the computing device may receive insurance information for the user of each of the plurality of mobile applications. The computing device may establish communication with each of these insurance information channels and monitor changes and/or new data that is generated within each of these channels. By constantly monitoring new data available at such insurance information channels, the computing device may be able to sense information about insurance users in real-time and may accordingly react to such information in real-time through one or more of these channels. For example, the computing device may sense that an insurance user is in the process of making changes to a subscribed automobile insurance policy in order to reduce his premiums through his user-end customer insurance mobile application. The computing device may further determine that the insurance user closed the mobile application and did not complete the changes that he was browsing with respect to his policy. The computing device may further detect that the same user (e.g., insurance user with the same insurance account) has been browsing different automobile insurance policies through his insurance web application. By gathering data points about the user through various different insurance channels that both the insurance user and the computing device have access to, the computing device may detect information about the user related to particular categories and may note the categories of information gathered about a particular insurance user from the various different insurance information channels. For example, the user may identify that changing automobile insurance policy premiums is an item of significant interest to the insurance user. The computing device may identify such items of interest to the insurance user by monitoring his activities or information reported by other parties (e.g., insurance agents) about the insurance user from various different insurance information channels.

At step 706, the computing device may determine an insurance policy decision based on the insurance information received from one or more mobile applications. After insurance information has been collected from one or more sources monitored by the computing device, the insurance information may be analyzed to determine the next steps that the insurance company has specified should occur for the type of information that has been collected. The computing device may identify the type of information collected and may categorize the type of information into a specific category based on the nature of the information. The computing device may then consult instructions and/or rules specified by an insurance organization for the category of information collected by the computing device. Based on the information collected, the computing device may collect further types of information requested by the insurance rules to further process the information already collected to make a strategic decision. For example, after the computing device identifies that a user has been browsing different automobile insurance policies through his insurance web application to lower his annual automobile insurance premium payments, the computing device may categorize such information as a "premium reduction" category. The computing device may consult rules that the insurance organization has specified on how to handle information collected that conforms to the "premium reduction" category. As an example, the insurance rules may specify to determine the history of account activity for the insurance user and determine whether the insurance user has paid his bills on time and been in compliance with the requirements of the insurance organization for a predetermined period of time to qualify for a premium reduction discount. After the computing device performs such determinations, the computing device may provide a strategic recommendation that the insurance user should be provided a discount on his annual premium because of the user's good standing.

At step 708, the computing device may generate a plurality of different messages related to the insurance policy decision for transmission to the user. As a result of making an insurance decision and/or strategic recommendation from data collected from one or more insurance information channels, the computing device may generate a plurality of different messages and notifications to be sent to the insurance policyholder and/or one or more insurance agents based on the insurance decision. For example, after the computing device determines to provide a strategic recommendation that the insurance user should be provided a discount on his annual premium because of the user's good standing, the computing device may generate such a message for display on the computing device of one of the insurance agency office's computing devices for an insurance agent to communicate to the user. Additionally or alternatively, the computing device may generate a message congratulating the user for their good standing and notify them that they are now eligible for a reduced annual insurance premium rebate.

At step 710, the computing device may the computing device may determine the characteristics and capabilities of each mobile application of the plurality of mobile applications. By analyzing each of the insurance information channels' associated programming and/or rules governing the function of each of the insurance channels, computing device may identify the capabilities and/or functions supported by each of these insurance information channels (e.g., identify that the user-end insurance claims mobile application serves to allow an insurance user to input his or her insurance claims information). By identifying the function and capabilities of each of the insurance information channels, the computing device may be able to know which channels to consult for specific types of information. For example, by identifying that the user-end insurance claims mobile application offers an insurance user the capability to input an automobile repair claim and upload photos and/or videos documenting the damage to the automobile, the computing device may in the future consult the user-end insurance claims mobile application when it needs to gather data about insurance claims proof from an insurance user.

At step 712, the computing device may determine which of the plurality of different mobile applications to deliver each of the plurality of different messages to. After identifying the capabilities of each of the insurance information channels, the computing device may identify which information channels are to serve as the target recipients for certain types of messages, alerts, and/or notifications generated by the computing device in response to processing information retrieved from the various information sources in real-time. For example, the computing device may determine that when an insurance claim is being processed and additional information is required from the user, the user-end insurance claims mobile application may be altered to communicate such a message to the insurance user. For instance, the computing device may modify a pending insurance item in the insurance claims mobile application to require additional proof of damage to an insured property for a pending insurance claim. The user-end insurance claims mobile application may generate alerts/notifications to its insurance user as governed by the settings of the insurance claims mobile application and/or the preferences of the user to remind the insurance user to upload additional proof of damage which may be eventually collected by the computing device for further analysis. Similarly, the computing device may determine which channel to deliver information to based on the insurance user's preferences in receiving particular types of information at particular different channels. For example, the insurance user may specify that he prefers to receive communication regarding his account through a phone call from an insurance agent. Additionally or alternatively, the computing device may automatically determine, by examining the past history of the insurance user's responsiveness to information delivered through different insurance channels, that the insurance user is more responsive to receiving certain types of information through a phone call from an insurance agent than receiving such information over other channels such as through a user-end consumer insurance mobile application or a notification delivered to his desktop insurance web application account. Accordingly, the computing device may determine that the message notifying the user about his eligibility to receive a promotional rebate for a lowered annual premium on his automobile insurance policy if he renews his contract should be delivered through an insurance agent.

At step 714, the computing device may adjust each of the plurality of messages into formats suitable for their corresponding determined destination mobile applications. By determining which insurance channel is to deliver the particular information to the insurance user, the computing device may format the message into a form appropriate for that insurance information channel. For example, upon determining that message notifying the user about his eligibility to receive a promotional rebate should be delivered through an insurance agent, the computing device may format the message to be displayed at the display screen of an insurance agent. The computing device may also format the message to provide the insurance agent with information about the past activities of the insurance user so that the insurance agent will be well informed about the insurance user during a telephone discussion in which the agent communicates the rebate to the insurance user. However if the same message regarding the rebate on the annual premium was to be communicated through the user-end consumer insurance mobile application, the computing device may format the message differently. For example, the computing device may generate the message as an in-app notification and/or an advertisement within the mobile application that the user may select for more information on the premium rebate.

At step 716, the computing device may transmit each message to its destination application. After the computing device has formatted the message based on the strategic recommendation and/or insurance decision derived from monitoring user activity across a variety of insurance information channels, the computing device may deliver the formatted message to its destination insurance channel and/or application. If the destination application is a mobile application, the computing device may instruct the mobile application to modify its current display to include the formatted message. If the destination application is a web application, the computing device may instruct the web application to generate the message in a portion of the GUI display of the web application. If the destination application is an insurance agent, the computing device may instruct the agency server to deliver the message and accompanying data on the user's past account activity to an insurance agent.

At step 718, the computing device may receive feedback from the insurance user about the policy decision. For example, the computing device may monitor how the insurance user reacts to the policy decision that was recently delivered to the insurance user. The computing device may monitor all of the different insurance channels that it has access to for any user feedback related to the policy decision and/or recommendation and/or information that it delivered to the destination application determined in step 712.

At step 720, the computing device may adjust future policy decisions based on the received feedback. Upon receiving user feedback on one or more insurance information channels from the insurance user regarding the policy decision and/or recommendation and/or information delivered through the destination application, the computing device may weigh the feedback based on the type of mobile application and/or insurance channel from which the feedback is received. For example, feedback from an insurance source through which the insurance user directly enters input (vs. an insurance information channel reporting user feedback second hand through an agent) may be weighted more heavily. The computing device may adjusting generation of future second insurance information based on the weighted feedback from each of the mobile applications.

Figure 8:
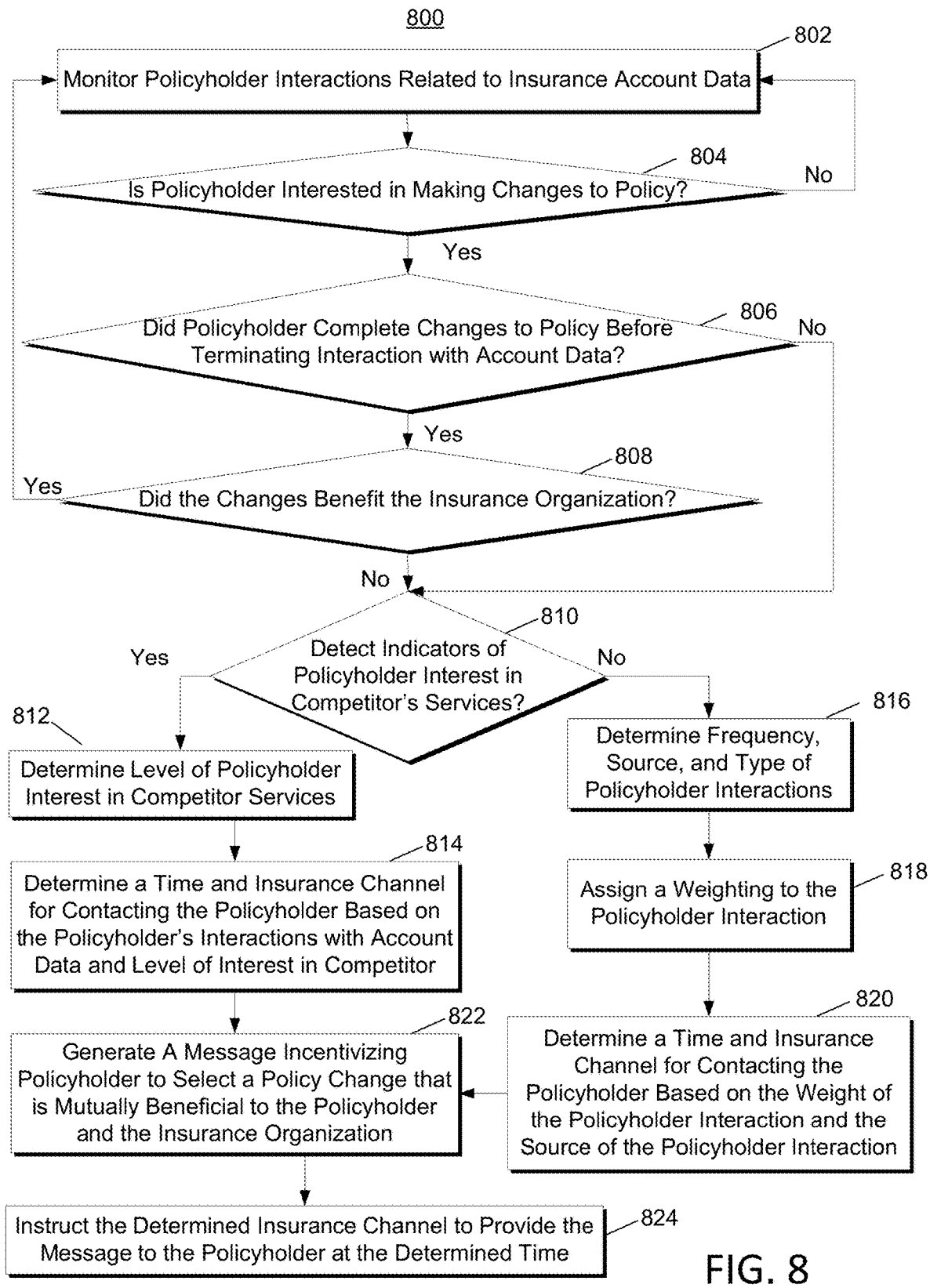
FIG. 8 is a flow chart illustrating an example method of monitoring an insurance policyholder's insurance activity and determining when to contact the policyholder based on the nature of the monitored insurance activity, according to one or more aspects described herein.

FIG. 8 is a flow chart illustrating an example method 800 of monitoring an insurance policyholder's insurance activity and determining when to contact the policyholder based on the nature of the monitored insurance activity. In some embodiments, the steps of method 800 may be performed by a computing device such as integrated enterprise insurance processing system 202 of FIGS. 2-4 and 6.

At step 802, the computing device may monitor the policyholder's interactions related to insurance account data. The computing device may monitor each activity occurring on each of the different insurance information channels that it communicates with. During the course of such monitoring, the computing device may identify each time an insurance policyholder logs into his or her account and edits settings and/or options associated with that policyholder's insurance policies. The computing device may continuously monitor each of the different channels for such activity, which may occur in different forms. For example, the computing device may monitor, user interactions with a user-end consumer insurance mobile application to determine if the insurance policyholder is editing settings and/or options associated with that policyholder's insurance policies on the user-end consumer insurance mobile application. Additionally, the computing device may monitor an insurance agency server to detect whether the insurance policyholder has interacted with an insurance agent and/or insurance agency IVR system and has explored, by conversing with the insurance agent and/or the insurance agency IVR system, changing settings and/or options associated with that his or her insurance policies. Similarly, the computing device may monitor each of the different insurance information channels for different forms in which an insurance policyholder may edit his or her account data (e.g., settings and/or options associated with that policyholder's insurance policies).

At step 804, the computing device may determine whether the policyholder is interested in making changes to his currently subscribed insurance policy. By analyzing the interactions of the insurance policyholder with his account data, in each of the different insurance information channel that the computing device monitors, the computing device may identify whether the policyholder is interested in making changes to the terms of his currently subscribed insurance policy. The computing device may further determine by analyzing the nature of policyholder's interactions with his account data whether the policyholder is making and/or exploring making changes to the terms of his currently subscribed insurance policy (e.g., increasing and/or decreasing the terms of his current policy coverage, adding an additional insurance policy, suspending and/or terminating a currently subscribed insurance policy, and/or changing the premium paid for a currently subscribed policy). However, if the computing device determines that the policyholder is not interested in making changes to his currently subscribed policy and is merely changing other account data (e.g., his contact information, account preferences, etc.), the method may return to step 802.

At step 806, in response to determining in step 804 that policyholder is interested in making changes to his currently subscribed insurance policy, the computing device may determine whether the policyholder has completed changes to his insurance policy before he termites his interaction with the account data. By monitoring the activities of the insurance policyholder, the computing device may determine whether the policyholder has completed the changes that he was in the process of making and/or exploring or whether the policyholder ended the session and/or activity without making and/or saving any changes to his or her currently subscribed insurance policies with insurance company. If the computing device determines that the policyholder did not complete making changes to his policy before terminating the interaction with his account data, the method 800 may proceed to step 810 to detect the presence of indicators of interest demonstrated by the policyholder in a competitor's services.

At step 808, in response to determining in step 806 that policyholder has completed changes to his insurance policy before he termites his interaction with the account data, the computing device may determine whether the changes made by the policyholder benefitted the insurance organization. For example, the computing device may determine whether the changes made to the insurance policy resulted in a profit to the insurance organization. The computing device may maintain a list of policy of changes as being beneficial to the insurance organization such as the policyholder renewing and/or extending the terms of his insurance coverage policy, adding additional insurance coverage to his or her preexisting policy, etc. The computing device may maintain a list of policy of changes that are not beneficial to the insurance organization such as the policyholder suspending and/or terminating his or her insurance coverage policy, and decreasing the amount of insurance coverage to his or her preexisting policy, etc. If the computing device detects that the changes have benefitted the insurance organization, the method 800 may return to step 802. However, if computing device detects that the changes have not benefitted the insurance organization, the method 800 may proceed to step 810 to detect the presence of indicators of interest demonstrated by the policyholder in a competitor's services.

At step 810, the computing device may determine whether it has detected any indicators of interest from the insurance policyholder in a competitor's services. For example, the computing device may determine whether the insurance policyholder has indicated, through any of the insurance information channels monitored by the computing device, that he or she is interested in the services offered by a competing insurance organization. The computing device may identify indications of interest in a competitor through several different techniques. The computing device may monitor the number of times and frequency with which the policyholder has browsed a competitor's services, the number of times and frequency with which the policyholder has mentioned to an insurance agent and/or a mobile application and/or insurance web application that he or she is interested in and/or prefers a competitor's services. The insurance policyholder may be surveyed, through the several different insurance information channels, whether he prefers any aspects of a competitor's services over that of the current insurance organization and/or the current insurance policy.

At step 812, in response to determining detection of indicators of interest from the insurance policyholder in a competitor's services, the computing device may determine a level of policyholder interest in the competitor's services. The computing device may calculate a level of interest (e.g., a score) in the competitor's services by analyzing the number of times, the frequency, and the number of different insurance information channels through which the policyholder has indicated his interested in the competitor's services.

At step 814, the computing device may determine a time and insurance channel for contacting the policyholder based on the policyholder's interactions with the account data and the determined level of interest in the competitor. For example, the computing device may analyze the policyholder's interactions with his account to cancel his policy coverage or reduce his coverage and also determine the level of interest in the competitor to determine how urgently the policyholder needs to be contacted to persuade them from committing to a competitor and taking their business away from the insurance organization. By determining a score for the level of urgency that the user needs to be contacted, the computing device may determine a time to contact the insurance policyholder and the insurance channel with which to contact the policyholder. For example, the insurance policyholder may have specified that he wishes to not be contacted over telephone during a specified time period (e.g., business hours) or at any time and prefers to receive all communications through in-app notifications and/or email. If the computing device determines that the level of urgency with which the user needs to be contacted does not exceed a predetermined threshold, the user may be contacted through his preferred mode of contact (e.g., email and/or mobile application notifications) at a time when the user is most receptive to being contacted (e.g. after business hours, weekends, etc.). However, if the level of urgency with which the user needs to be contacted, based on the monitored interactions of the policyholder with his insurance account and/or the level of interest that he or she has demonstrated in the competitor's service exceeds such a predetermined threshold, the computing device may determine a more immediate time (e.g., within a few minutes of the user making potentially detrimental changes) and more invasive channel of communication (e.g. telephone call and/or in-person visit from an insurance agent) with which to contact the policyholder.

At step 816, in response to determining, in step 810, that the insurance policyholder is not interested in a competitor's services, the computing device may determine the frequency, source, and type of policyholder interactions with his account data. For example, the computing device may analyze the policyholder's interactions with his account, to perform actions that could potentially be detrimental to the insurance organization, to determine how frequently the policyholder has engaged in such activities. The computing device may also analyze the type of interactions and the insurance channel through which the policyholder has engaged in activities that have been flagged as being potentially detrimental to the insurance organization.

At step 818, the computing device may assign a weighting to the policyholder interaction. Based on the information gathered about the frequency, source, and type of policyholder interactions with his account data to perform activities that are potentially detrimental to the insurance organization, the computing device may assign a weight to how urgently the policyholder needs to be contacted.

At step 820, the computing device may determine a time and insurance channel for contacting the policyholder based on the weight of the policyholder interaction and the source of the policyholder interaction. By determining a score for the level of urgency that the user needs to be contacted, the computing device may determine a time to contact the insurance policyholder and the insurance channel with which to contact the policyholder.

At step 822, the computing device may generate a message incentivizing the policyholder to select a policy change that is mutually beneficial to the policyholder and to the insurance organization. Upon determining that the insurance policyholder is interested in making or has already made changes that are not beneficial to the insurance organization, the computing device may generate a message incentivizing the insurance policyholder to perform actions that guarantee a mutually beneficial outcome for both the insurance organization and the policyholder. For example, the computing device may determine one or more items of interest to the insurance policyholder by monitoring the recent activity of the insurance policyholder. Additionally, by analyzing account information and the policyholder's insurance policy coverage, the computing device may determine a promotion that the insurance policyholder is eligible to receive. The promotion identified by the computing may be determined such that it is directly related to at least one of the items of interest to the insurance policyholder. For example, by analyzing that the user is interested in lowing his annual premiums (e.g., an item of interest that the policyholder has been interested in as evidence from his recently interactions with his account data), the computing device may analyze the payment history and good standing of the policyholder. The computing device may determine that the policyholder has paid his bills on time, has not had any accidents, and has been in compliance with the insurance organization's policies over a predetermined period of time. Upon determining that the policyholder is a low risk individual and a policyholder with good standing, the computing device may determine that the policyholder is eligible to receive a promotional rebate on a policy renewal and/or extension. The computing device may generate a message including the details of the promotion and may also format the message for the determined insurance channel through which the message is to be communicated to the policyholder.

At step 824, the computing device may instruct the determined insurance channel to provide the generated message to the policyholder at the determined time. The computing device may instruct the insurance channel that has been identified as the mode for contacting the user to deliver the message determined at step 822 at the time calculated at step 820 or step 814.

Although the systems, methods, etc. described herein are generally described in the context of real estate and automobile insurance, the systems, methods, etc. may be used with various other types of insurance. Various aspects of the systems, methods, etc. described herein may be used with various types of insurance without departing from the disclosure. In addition, the terms "insurance policyholder" may be used interchangeably with "user" and does not require that the user is already a customer or policyholder of an insurance company. Rather, "insurance policyholder" may include a current policyholder, a prior policyholder, someone covered by a policy being held by a policyholder, and future policyholders.

While the aspects described herein have been discussed with respect to specific examples including various modes of carrying out aspects of the disclosure, those skilled in the art will appreciate that there are numerous variations and permutations of the above described systems and techniques that fall within the spirit and scope of the disclosure. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the disclosure.

What is claimed is:

1. A method of using a vehicle telemetry system to modify an order of natural language IVR menu options generated by an interactive voice response (IVR) computing device, the method comprising:
    receiving telematics information associated with a user, wherein the telematics information is collected directly from the vehicle telemetry system of a vehicle;
    identifying one or more items of interest to the user by analyzing at least two of: a past insurance activity of the user, the received telematics information, account information, and an insurance policy coverage associated with the user as an insurance policyholder;
    assigning, by the IVR computing device, a weighting to the one or more identified items of interest based on the analyzed past insurance activity and the received telematics information;
    generating, by the IVR computing device, a plurality of natural language IVR menu options, wherein one or more of the plurality of natural language IVR menu options corresponds to the one or more identified items of interest;
    in response to an incoming call to the IVR computing device, modifying an order of the plurality of natural language IVR menu options according to the weighting of an identified item of interest corresponding to the one or more of the plurality of natural language IVR menu options; and
    transmitting, by the IVR computing device to a telecommunications device associated with the user, an automated IVR dialog prompting a verbal communication with the user, wherein the automated IVR dialog presents the plurality of natural language IVR menu options in the modified order.

2. The method of claim 1, further comprising:
    receiving, by the IVR computing device and from the telecommunications device, an incoming call, wherein the incoming call comprises identification information identifying an entity associated with the telecommunications device;

determining, by the IVR computing device, whether the call is received from the user based on the identification information; and wherein the plurality of natural language IVR menu options are provided by the IVR computing device to the telecommunications device associated with the user as an automated response to the incoming call.

3. The method of claim 1, wherein the one or more items of interest are further identified by analyzing the account information and the insurance policy coverage associated with the user as the insurance policyholder.

4. The method of claim 1, wherein analyzing the past insurance activity further comprises at least one of:

analyzing, by the IVR computing device, one or more interactions between the user and an insurance agent;

determining, by the IVR computing device, whether the user has been interested in making changes to a corresponding insurance account;

determining, by the IVR computing device, which other insurance organizations the user has been browsing; and analyzing, by the IVR computing device, the telematics information associated with the user.

5. The method of claim 1, further comprising:

detecting, by the IVR computing device, that the user has engaged in an additional activity associated with at least one item of interest of the one or more items of interest;

adjusting the weighting of the at least one item of interest of the one or more identified items of interest based on the detected additional activity; and in response to determining that the adjusted weighting of the at least one item of interest has resulted in a modification in an order in which the items of interest are weighted, modifying the order of an IVR menu option corresponding to the at least one item of interest.

6. The method of claim 1 further comprising:

monitoring, by the IVR computing device, interactions of the user with account data, wherein the monitoring comprises identifying a frequency of the interactions and whether the interactions indicate that the user is interested in implementing changes to the account data;

responsive to determining that the user did not complete the changes to the account data:

determining whether the user is browsing insurance information from a competitor; and responsive to determining that the user is browsing the insurance information of the competitor, determining, by the IVR computing device, a time to contact the user within a predetermined amount of time from when the user was browsing the insurance information of the competitor.

7. The method of claim 6, further comprising:

responsive to determining that the user is not browsing the insurance information of the competitor, determining, by the IVR computing device, another time to contact the user based on the frequency and number of interactions with the account data.

8. The method of claim 6, further comprising:

determining, by the IVR computing device, the level of interest of the user, in the competitor by monitoring interactions of the user with the insurance information of the competitor; and determining, by the IVR computing device, the time to contact the user, based on the determined level of interest of the user in the competitor.

9. The method of claim 6, further comprising:

generating, by the IVR computing device, a message incentivizing the user to complete the changes to the account data, wherein generating the message further comprises:

determining, by the IVR computing device, one or more items of interest to the user by monitoring recent activity of the user;

analyzing, by the IVR computing device, the account information and the insurance policy coverage associated with the user to determine a promotion that the user is eligible to receive, wherein the promotion is related to at least one of the items of interest to the user; and generating, by the IVR computing device, the message comprising details of the promotion; and instructing, by the IVR computing device and to a computing device associated with an insurance agent to provide, to the user at the determined time, the message incentivizing the user to complete the changes to the account data.

10. A system comprising:

an interactive voice response (IVR) computing device;

a vehicle telemetry device of a vehicle;

a telecommunications device associated with a user;

at least one processor; and at least one memory storing instructions that, when executed by the at least one processor, cause the system to:

receive telematics information associated with a user, wherein the telematics information is collected directly from the vehicle telemetry device of the vehicle;

identify one or more items of interest to the user by analyzing at least two of: a past insurance activity of the user, the received telematics information, account information, and an insurance policy coverage associated with the user as an insurance policyholder;

assign a weighting to the one or more identified items of interest based on the analyzed past insurance activity of the user and the received telematics information;

generate a plurality of natural language interactive voice response (IVR) menu options, wherein one or more of the plurality of natural language IVR menu options corresponds to the one or more identified items of interest;

in response to an incoming call to the IVR computing device, modify an order of the plurality of natural language IVR menu options according to the weighting of an identified item of interest corresponding to the one or more of the plurality of natural language IVR menu options; and transmit, by the IVR computing device to the telecommunications device, an automated IVR dialog prompting a verbal communication with the user, wherein the automated IVR dialog presents the plurality of natural language IVR menu options in the modified order.

11. The system of claim 10, wherein the instructions, when executed by the at least one processor, further cause the system to:

receive an incoming call from the telecommunications device, wherein the incoming call comprises identification information identifying an entity from which the incoming call is received;

determine whether the call is received from the user based on the identification information; and wherein the plurality of natural language IVR menu options are provided to the telecommunications device as an automated response to the incoming call.

12. The system of claim 10, wherein the instructions, when executed by the at least one processor, cause the system to analyze the past activity by further causing the system to perform at least one of:
   analyze one or more interactions between the user and an insurance agent;
   determine whether the user has been interested in making changes to a corresponding insurance account;
   determine which other insurance organizations the user has been browsing; and
   analyze the telematics information associated with the user.

13. The system of claim 12, wherein the vehicle telemetry device further comprises a port that interfaces with tire pressure sensors of the vehicle of the user, and wherein the telematics information comprises information about accidents involving the vehicle and a speeding history of the vehicle.

14. The system of claim 10, wherein the instructions, when executed by the at least one processor, further cause the system to:
   detect that the user has engaged in an additional activity associated with at least one of the one or more items of interest;
   adjust the weighting of the at least one item of interest of the one or more identified items of interest based on the detected additional activity; and
   in response to determining that the adjusted weighting of the at least item of interest has resulted in a modification in an order in which the items of interest are weighted, modify the order in which an IVR menu option, corresponding to the at least one item of interest, is provided to the telecommunications device associated with the user.

15. The system of claim 10, wherein the instructions, when executed by the at least one processor, further cause the system to:
   monitor interactions of the user with account data, wherein the monitoring comprises identifying a frequency of the interactions and whether the interactions indicate that the user is interested in implementing changes to the account data;
   responsive to determining that the user did not complete the changes to the account data: determine whether the user is browsing insurance information from a competitor; and
   responsive to determining that the user is browsing the insurance information of the competitor, determine a time to contact the user within a predetermined amount of time from when the user was browsing the insurance information of the competitor.

16. The system of claim 15, wherein the instructions, when executed by the at least one processor, further cause the system to:
   responsive to determining that the user is not browsing insurance information of a competitor, determine another time to contact the user based on the frequency and number of interactions with the account data.

17. The system of claim 15, wherein the instructions, when executed by the at least one processor, further cause the system to:
   determine a level of interest of the user in the competitor detected by monitoring interactions of the user with the insurance information of the competitor; and
   determine the time to contact the user based on the determined level of interest of the user in the competitor.

18. The system of claim 15, wherein the instructions, when executed by the at least one processor, further cause the system to:
   generate a message incentivizing the user to complete the changes to the account data; and
   instruct a computing device associated with an insurance agent to provide, to the user at the determined time, the message incentivizing the user to complete the changes to the account data.

19. The system of claim 18, wherein the instructions, when executed by the at least one processor, further cause the system to generate the message by further causing the system to:
   determine one or more items of interest to the user by monitoring recent activity of the user;
   analyze the account information and the insurance policy coverage associated with the user to determine a promotion that the user is eligible to receive, wherein the promotion is related to at least one of the items of interest to the user; and
   generate the message comprising details of the promotion.

20. A non-transitory computer-readable medium comprising computer-executable instructions for causing an interactive voice response (IVR) computing device to perform a method comprising:
   receiving telematics information associated with a user, wherein the telematics information is collected directly from a vehicle telemetry system of a vehicle;
   identifying one or more items of interest to the user by analyzing at least two of: a past insurance activity of the user, the received telematics information, account information, and an insurance policy coverage associated with the user as an insurance policyholder;
   assigning a weighting to the one or more identified items of interest based on the analyzed past insurance activity and the received telematics information;
   generating a plurality of natural language IVR menu options, wherein one or more of the plurality of natural language IVR menu options corresponds to the one or more identified items of interest;
   in response to an incoming call to the IVR computing device, modifying an order of the plurality of natural language IVR menu options according to the weighting of an identified item of interest corresponding to the one or more of the plurality of natural language IVR menu options;
   transmitting, by the IVR computing device to a telecommunications device associated with the user, an automated IVR dialog prompting a verbal communication with the user, wherein the automated IVR dialog presents the plurality of natural language IVR menu options in the modified order.

* * * * *

UNITED STATES PATENT AND TRADEMARK OFFICE
CERTIFICATE OF CORRECTION

PATENT NO. : 10,580,079 B1  
APPLICATION NO. : 14/747554  
DATED : March 3, 2020  
INVENTOR(S) : Chen Page 1 of 1

It is certified that error appears in the above-identified patent and that said Letters Patent is hereby corrected as shown below:

In the Specification

Column 7, Detailed Description, Line 11:
Delete "208" and insert --228--

Column 18, Detailed Description, Line 25:
Delete "224." and insert --614.--

In the Claims

Column 33, Line 64:
In Claim 8, delete "the" and insert --a--

Column 33, Line 65:
In Claim 8, delete "user," and insert --user--

Column 35, Line 32:
In Claim 14, after "least", insert --one--

Column 36, Line 18:
In Claim 19, delete "claim 18," and insert --claim 15,--

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*